United States Patent
Yu et al.

(10) Patent No.: US 12,489,333 B2
(45) Date of Patent: Dec. 2, 2025

(54) MOTOR

(71) Applicant: LG INNOTEK CO., LTD., Seoul (KR)

(72) Inventors: Hyun Soo Yu, Seoul (KR); Min Oak Kim, Seoul (KR)

(73) Assignee: LG INNOTEK CO., Seoul (KR)

( * ) Notice: Subject to any disclaimer, the term of this patent is extended or adjusted under 35 U.S.C. 154(b) by 336 days.

(21) Appl. No.: 18/009,423

(22) PCT Filed: Apr. 16, 2021

(86) PCT No.: PCT/KR2021/004789
§ 371 (c)(1),
(2) Date: Dec. 9, 2022

(87) PCT Pub. No.: WO2021/251610
PCT Pub. Date: Dec. 16, 2021

(65) Prior Publication Data
US 2023/0223812 A1     Jul. 13, 2023

(30) Foreign Application Priority Data

Jun. 10, 2020 (KR) .................. 10-2020-0070299
Jun. 11, 2020 (KR) .................. 10-2020-0070859
(Continued)

(51) Int. Cl.
*H02K 5/16* (2006.01)
*H02K 5/10* (2006.01)

(52) U.S. Cl.
CPC ............... *H02K 5/161* (2013.01); *H02K 5/10* (2013.01)

(58) Field of Classification Search
CPC .................. H02K 5/161; H02K 5/10
(Continued)

(56) References Cited

U.S. PATENT DOCUMENTS

2004/0066111 A1* 4/2004 Torii .............. H02K 7/1166
    310/239
2006/0071566 A1* 4/2006 Ha .................. H02K 5/08
    310/89
(Continued)

FOREIGN PATENT DOCUMENTS

JP    06-032771    8/1994
JP    2004-135416    4/2004
(Continued)

OTHER PUBLICATIONS

International Search Report dated Jul. 22, 2021 issued in Application No. PCT/KR2021/004789.
(Continued)

*Primary Examiner* — Forrest M Phillips
(74) *Attorney, Agent, or Firm* — KED & ASSOCIATES

(57) ABSTRACT

The present invention may provide a motor comprising: a housing; a stator disposed inside the housing; a rotor disposed inside the stator; and a shaft coupled to the rotor. The housing includes a first housing and a second housing. The first housing includes a first side wall having a first radius and a second side wall having a second radius smaller than the first radius, and the second housing includes a third side wall contacting the first side wall and a fourth side wall contacting the second side wall. The outer surface of the first side wall includes a first coupling means, and the inner surface of the third side wall includes a second coupling means coupled to the first coupling means.

10 Claims, 52 Drawing Sheets

(30) Foreign Application Priority Data

Aug. 11, 2020 (KR) ........................ 10-2020-0100648
Aug. 11, 2020 (KR) ........................ 10-2020-0100649

(58) Field of Classification Search
USPC .......................................................... 310/89
See application file for complete search history.

(56) References Cited

U.S. PATENT DOCUMENTS

| | | | | |
|---|---|---|---|---|
| 2007/0182259 A1* | 8/2007 | Sakata | ................... | H02K 21/16 310/90 |
| 2007/0210655 A1* | 9/2007 | Bahr | ................... | H02K 5/203 310/89 |
| 2007/0241625 A1* | 10/2007 | Terauchi | ................ | H02K 29/12 310/68 B |
| 2008/0001489 A1* | 1/2008 | Paone | ................... | H02K 7/102 310/88 |
| 2022/0060078 A1* | 2/2022 | Ishikawa | ................. | H02K 9/19 |
| 2022/0271598 A1* | 8/2022 | Kamizato | ............. | H02K 5/225 |

FOREIGN PATENT DOCUMENTS

| | | |
|---|---|---|
| KR | 10-2006-0041363 | 5/2006 |
| KR | 20-2010-0006435 | 6/2010 |
| KR | 10-2015-0090692 | 8/2015 |
| KR | 10-2016-0052926 | 5/2016 |
| KR | 10-2017-0092305 | 8/2017 |
| KR | 10-2020-0009531 | 1/2020 |

OTHER PUBLICATIONS

Korean Office Action issued in Application No. 10-2020-0070299 dated May 22, 2025.
Korean Office Action issued in Application No. 10-2020-0070859 dated May 22, 2025.
Korean Office Action issued in Application No. 10-2020-0100648 dated Jun. 20, 2025.

* cited by examiner

[FIG. 1]
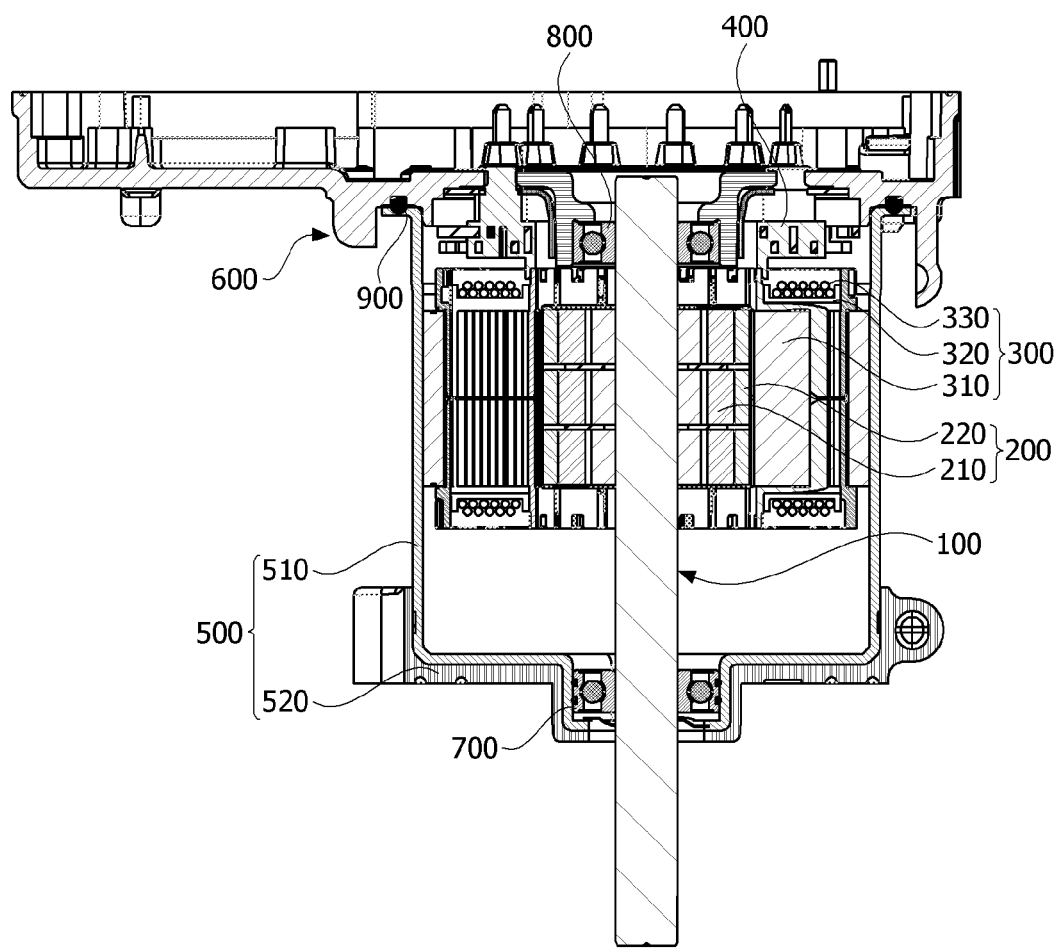

[FIG. 2]
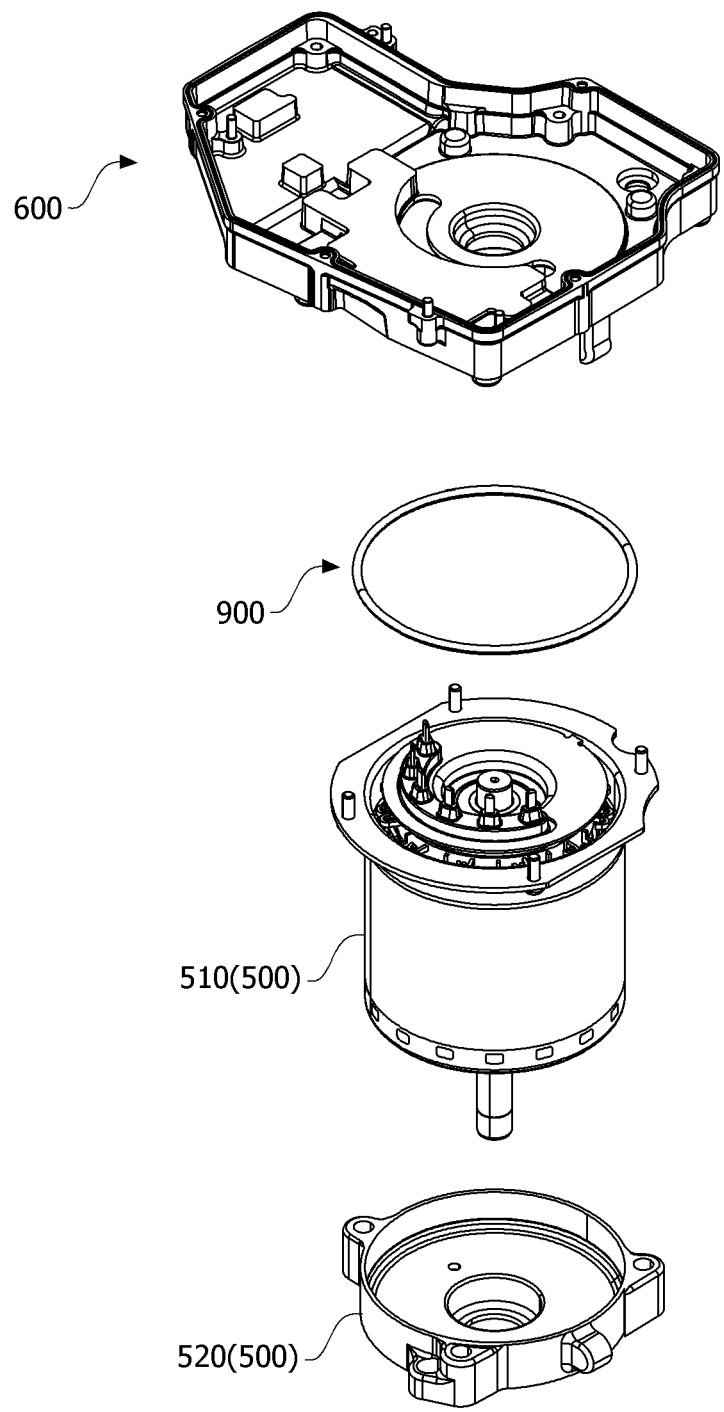

[FIG. 3]
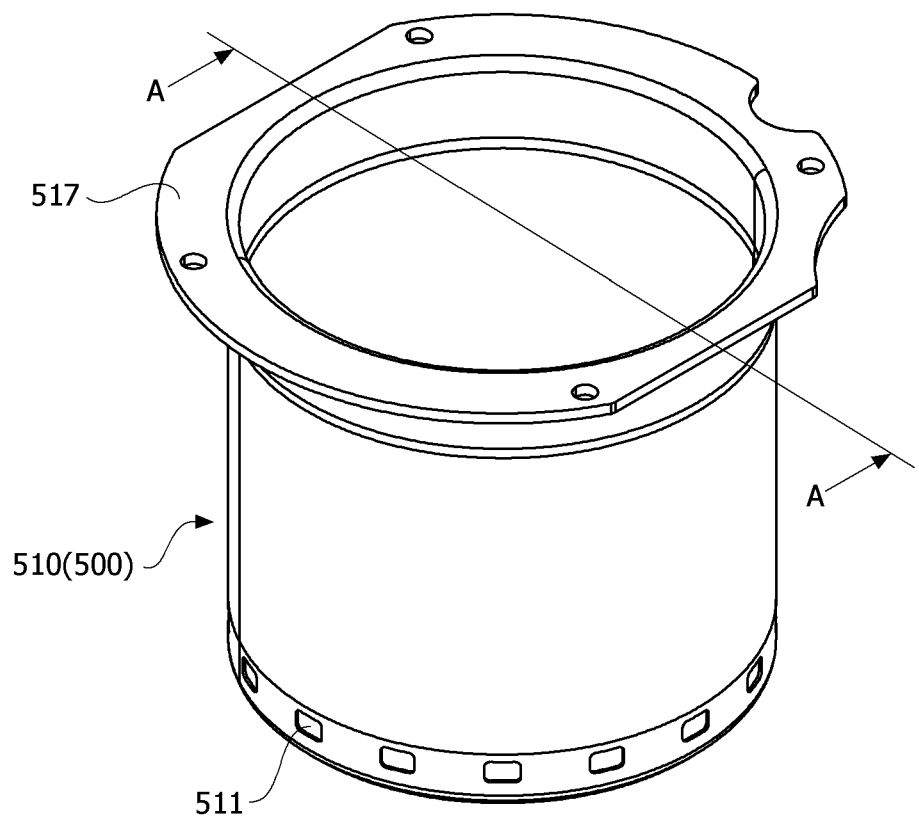

[FIG. 4]
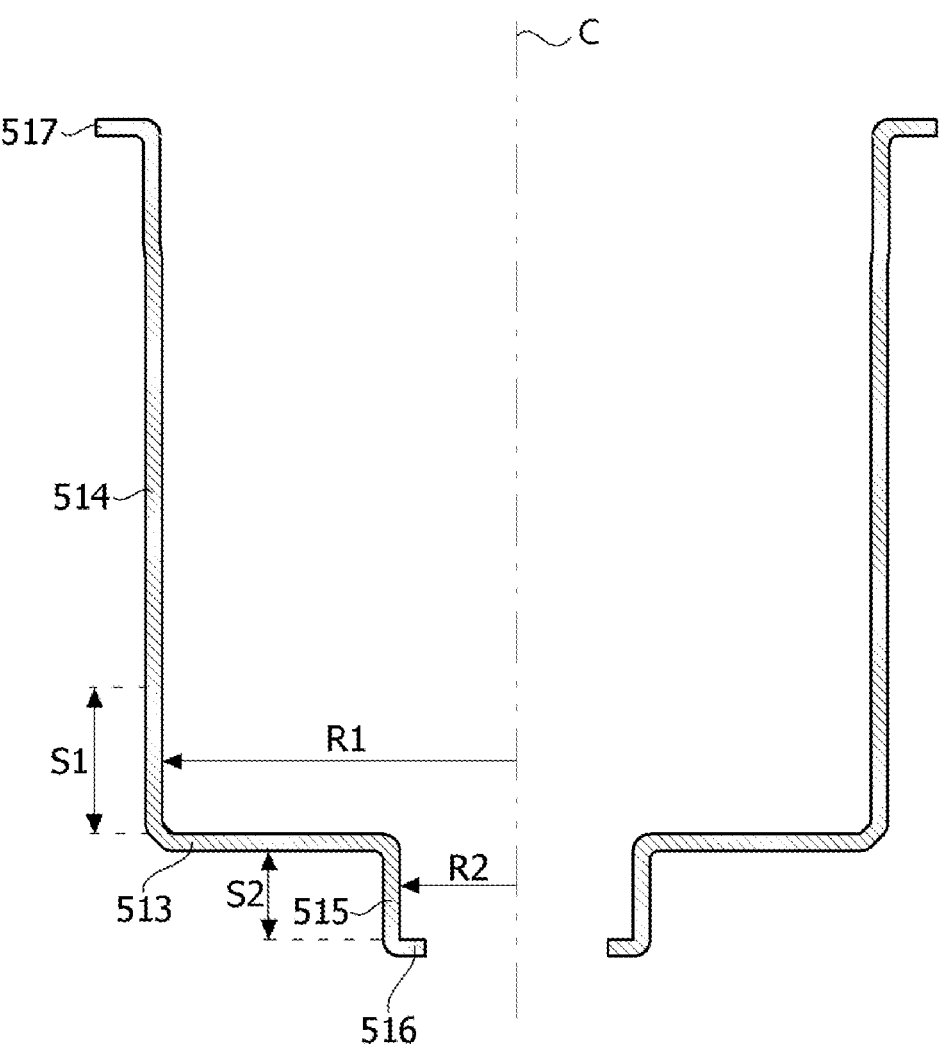

[FIG. 5]
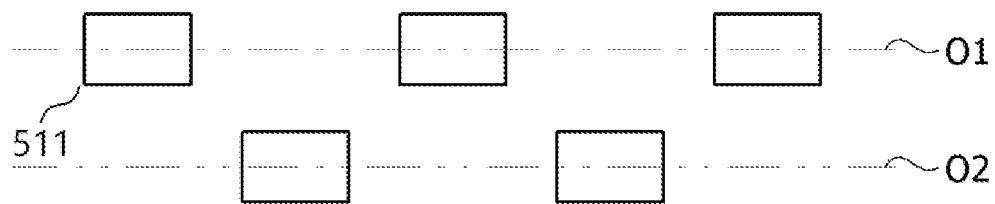

[FIG. 6]
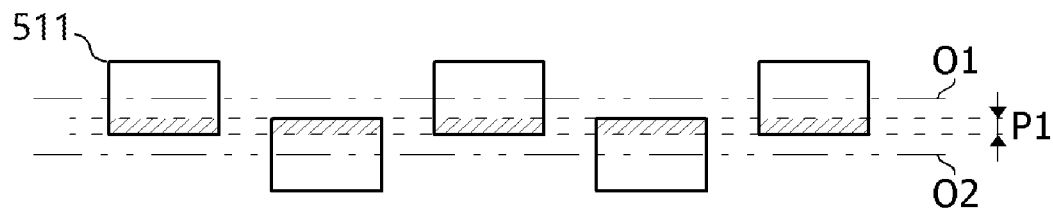

[FIG. 7]
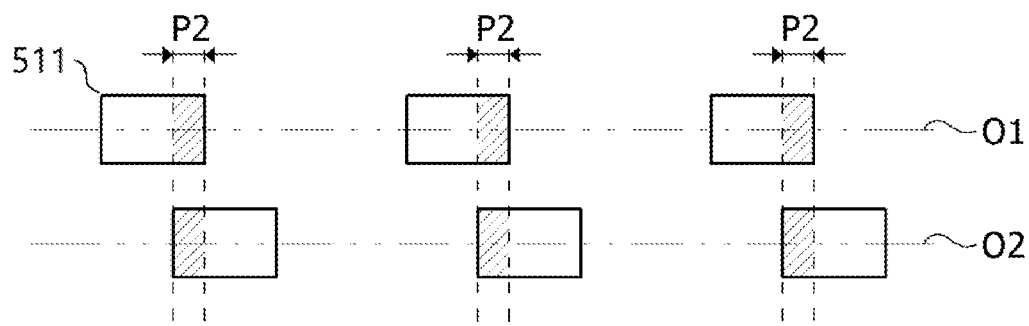

[FIG. 8]
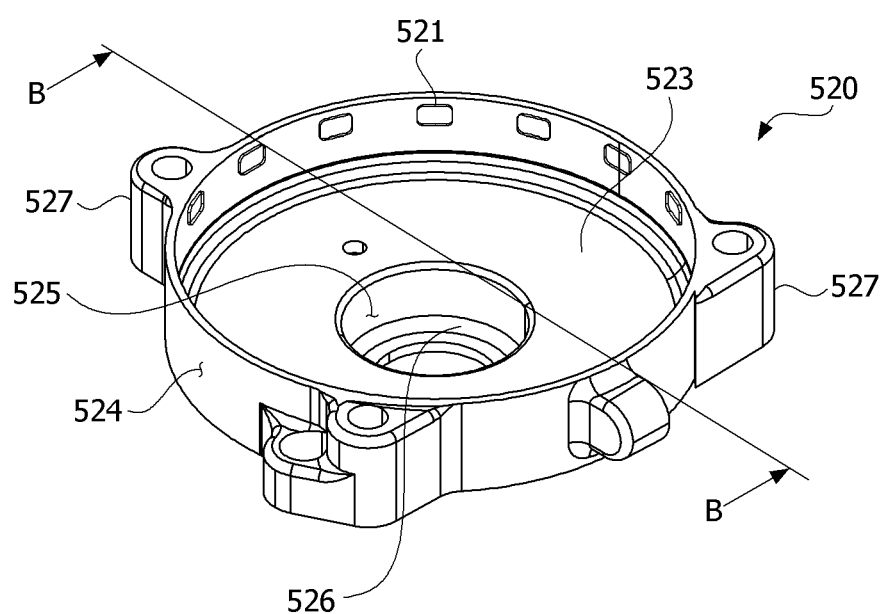

[FIG. 9]
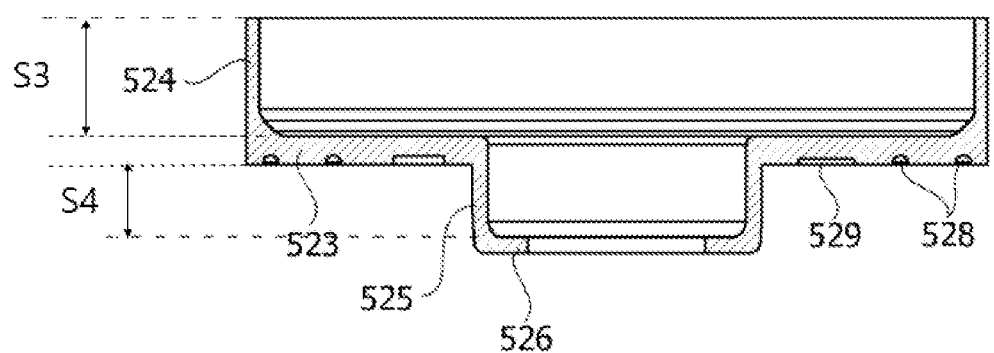

[FIG. 10]
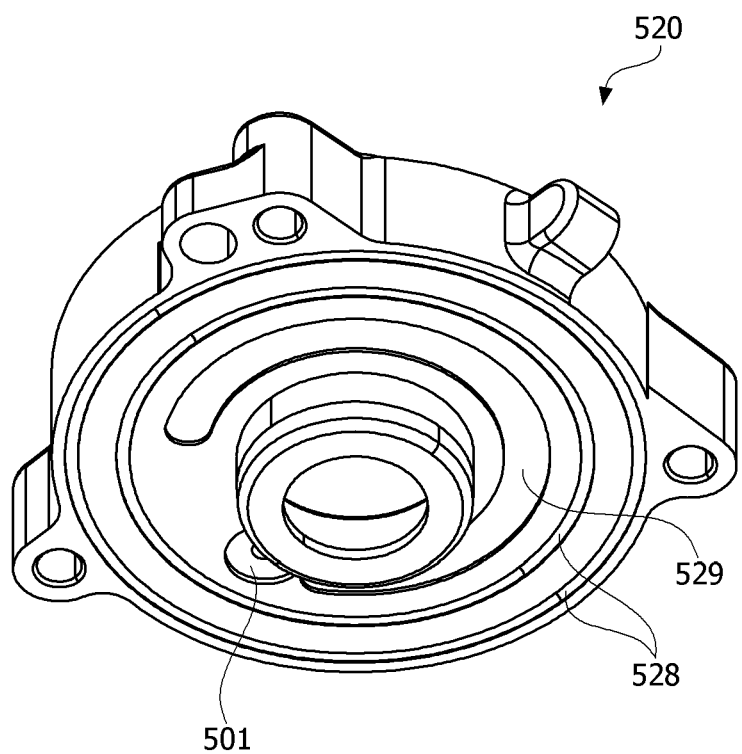

[FIG. 11]
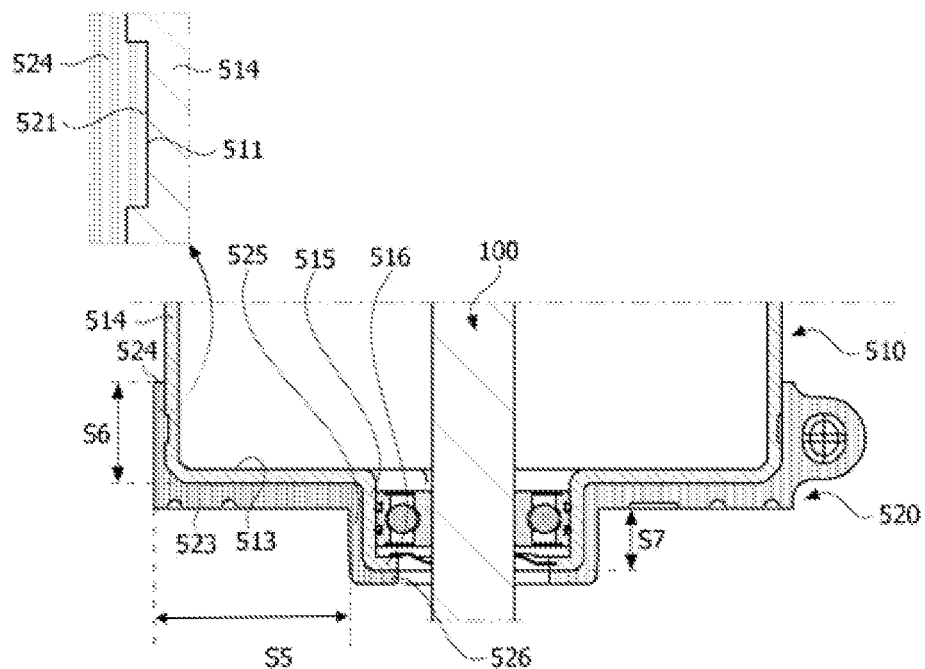

[FIG. 12]
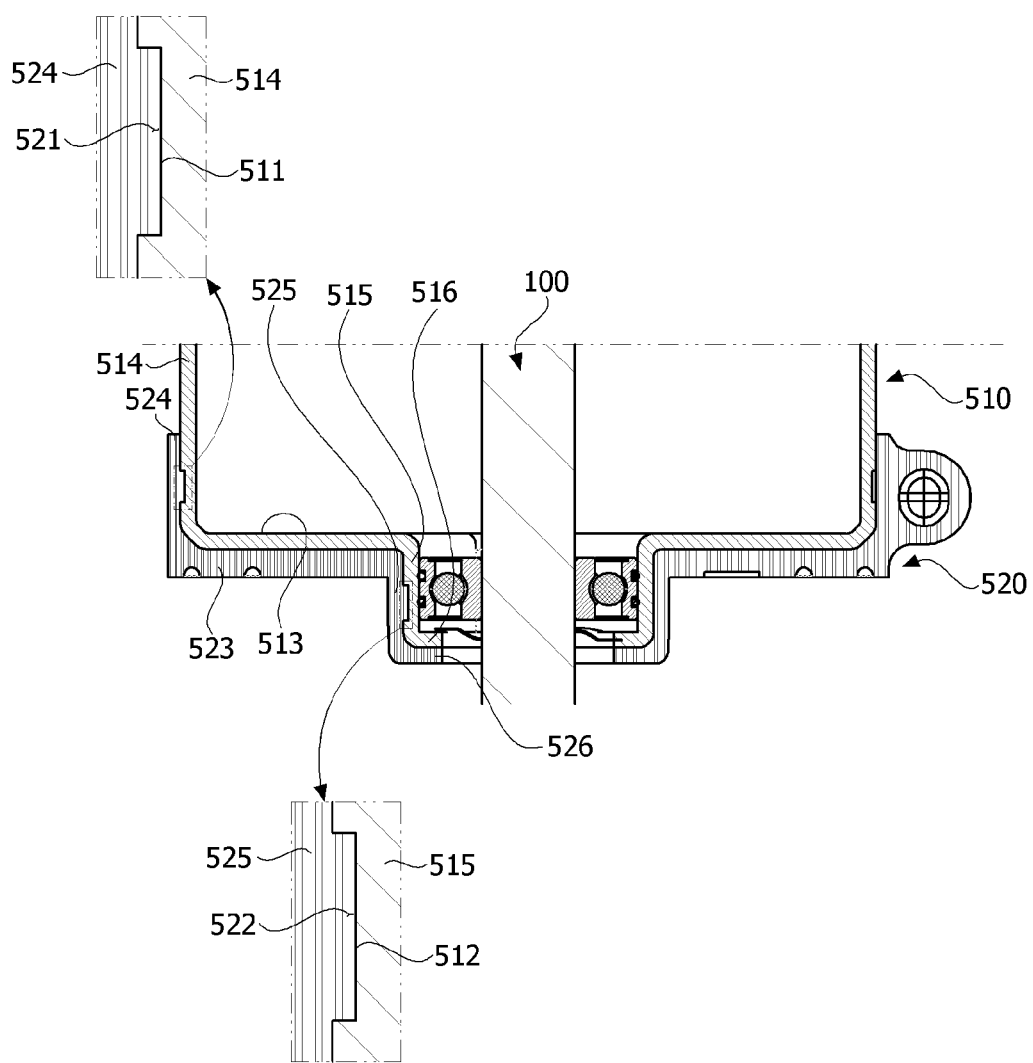

[FIG. 13]
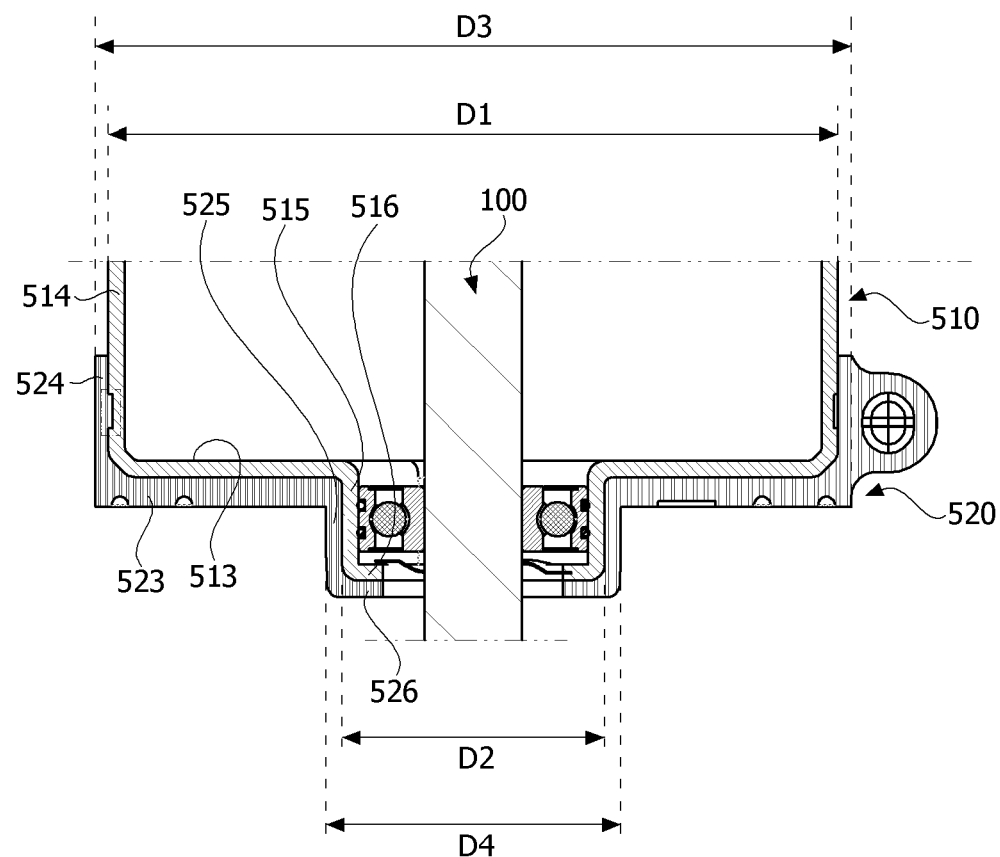

[FIG. 14]
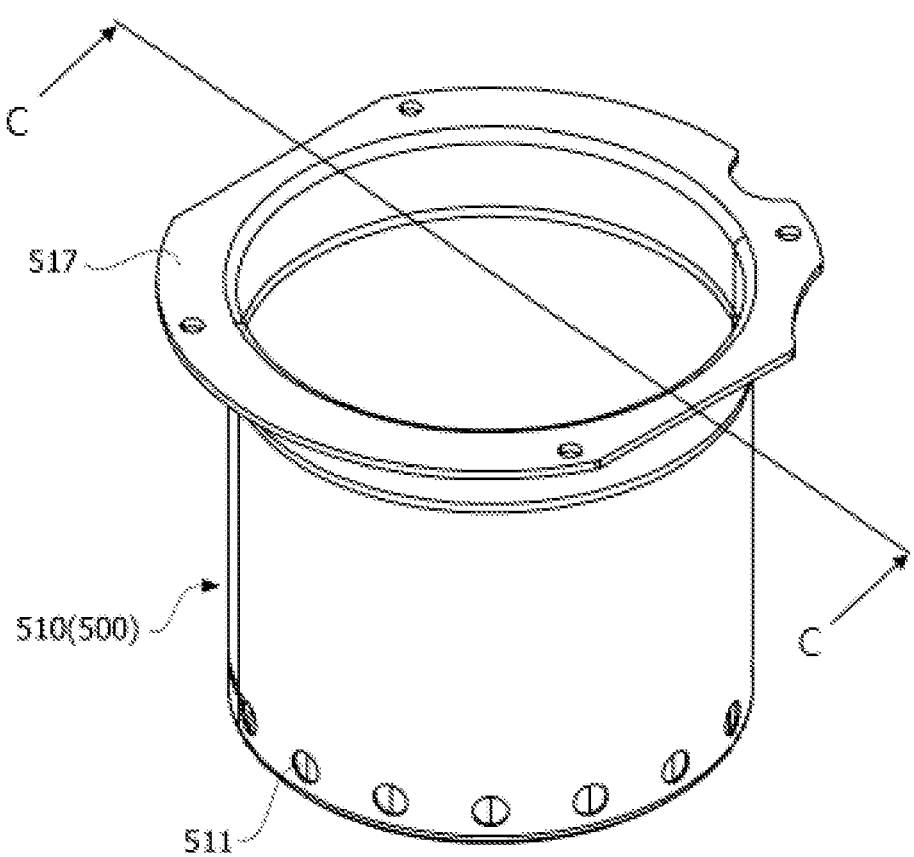

[FIG. 15]
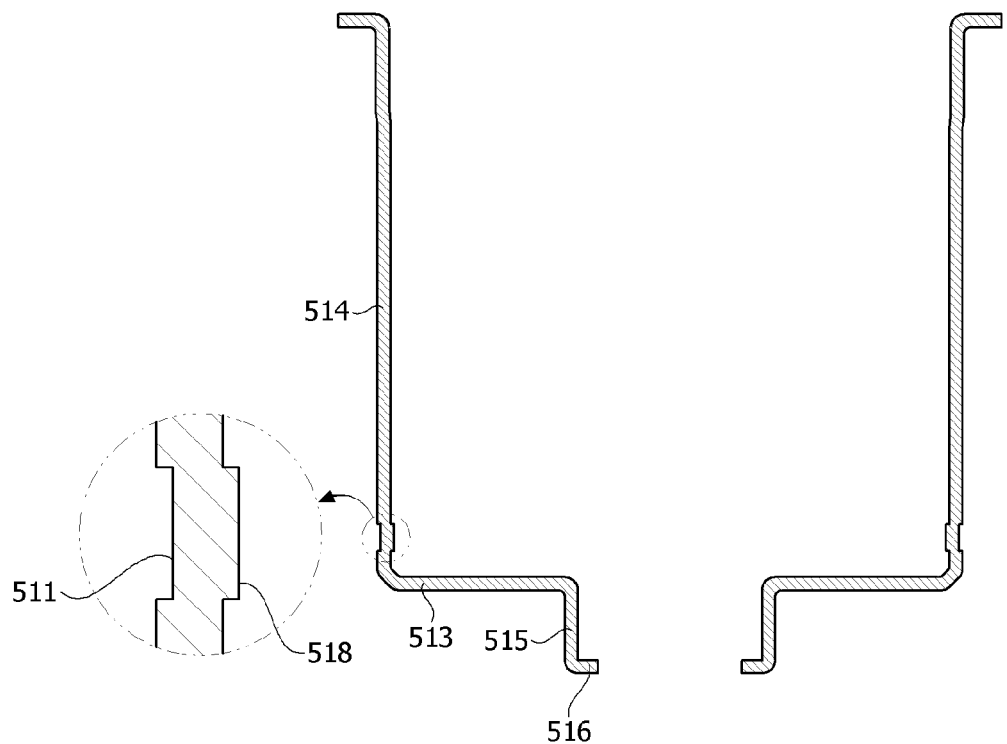

[FIG. 16]
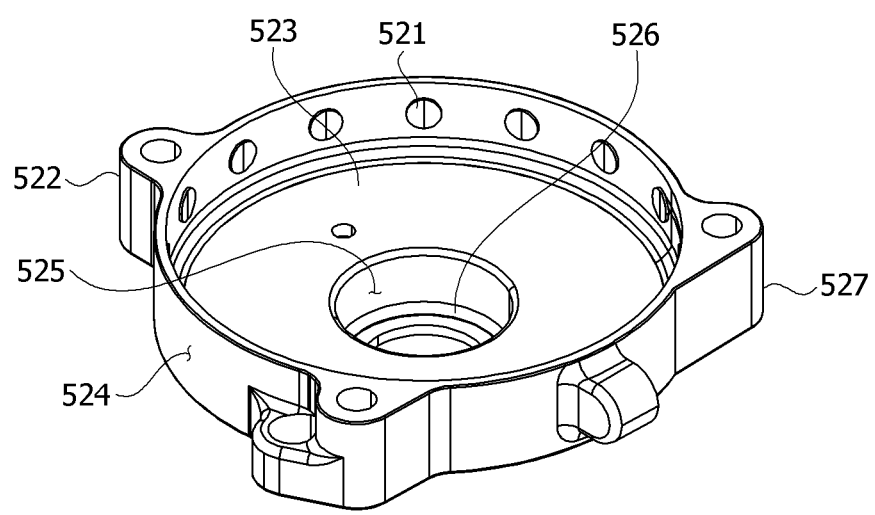

[FIG. 17]
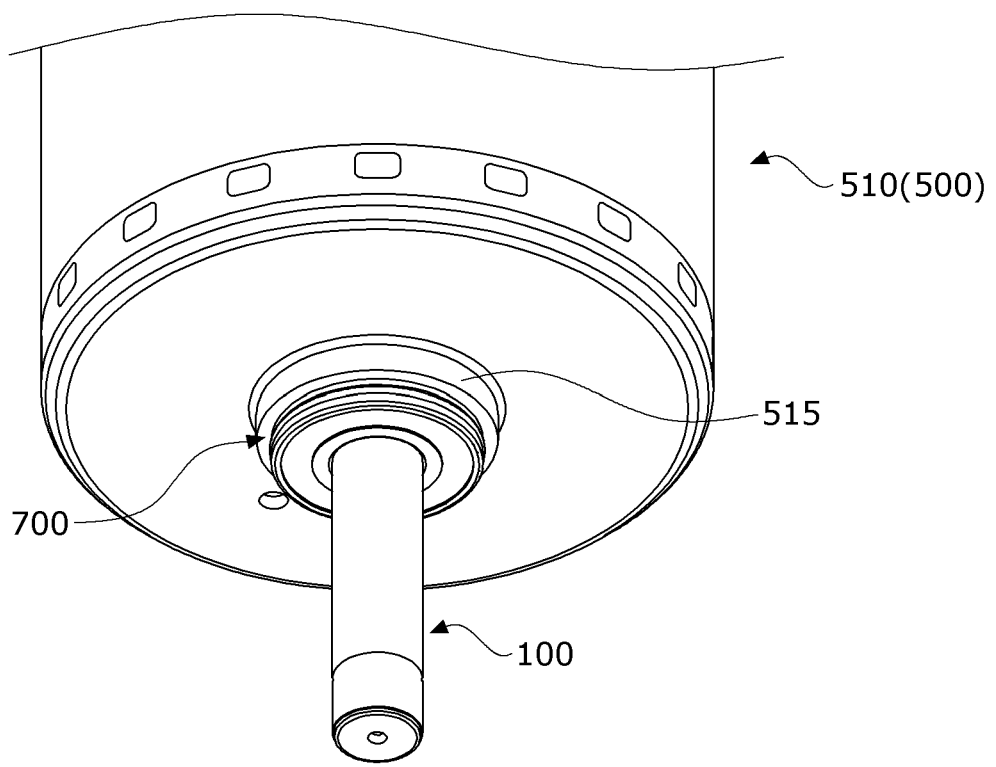

[FIG. 18]
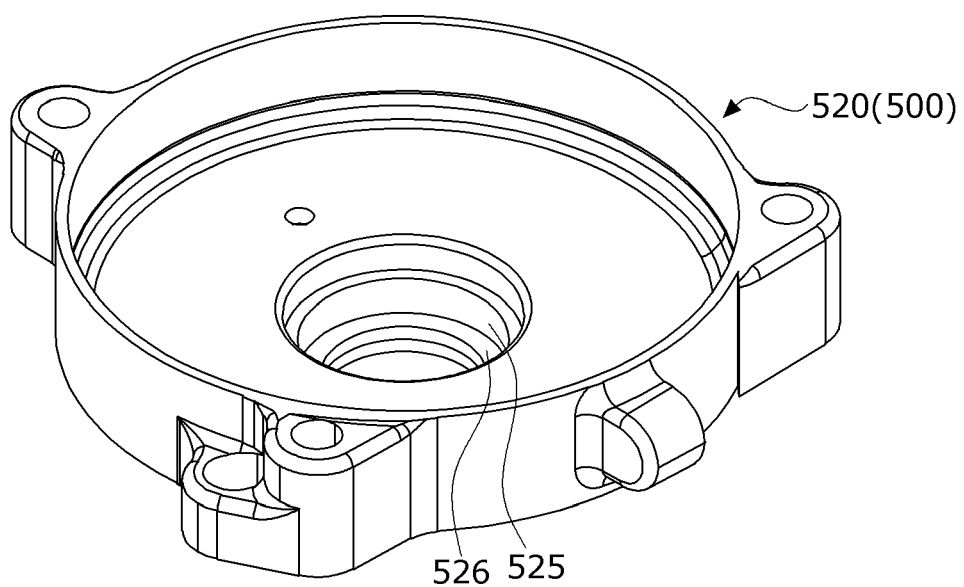

[FIG. 19]
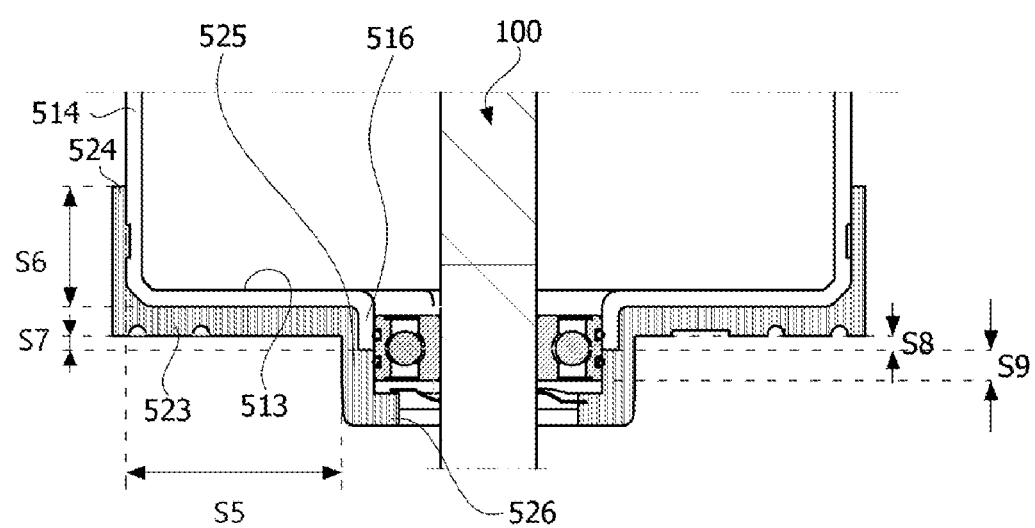

[FIG. 20]
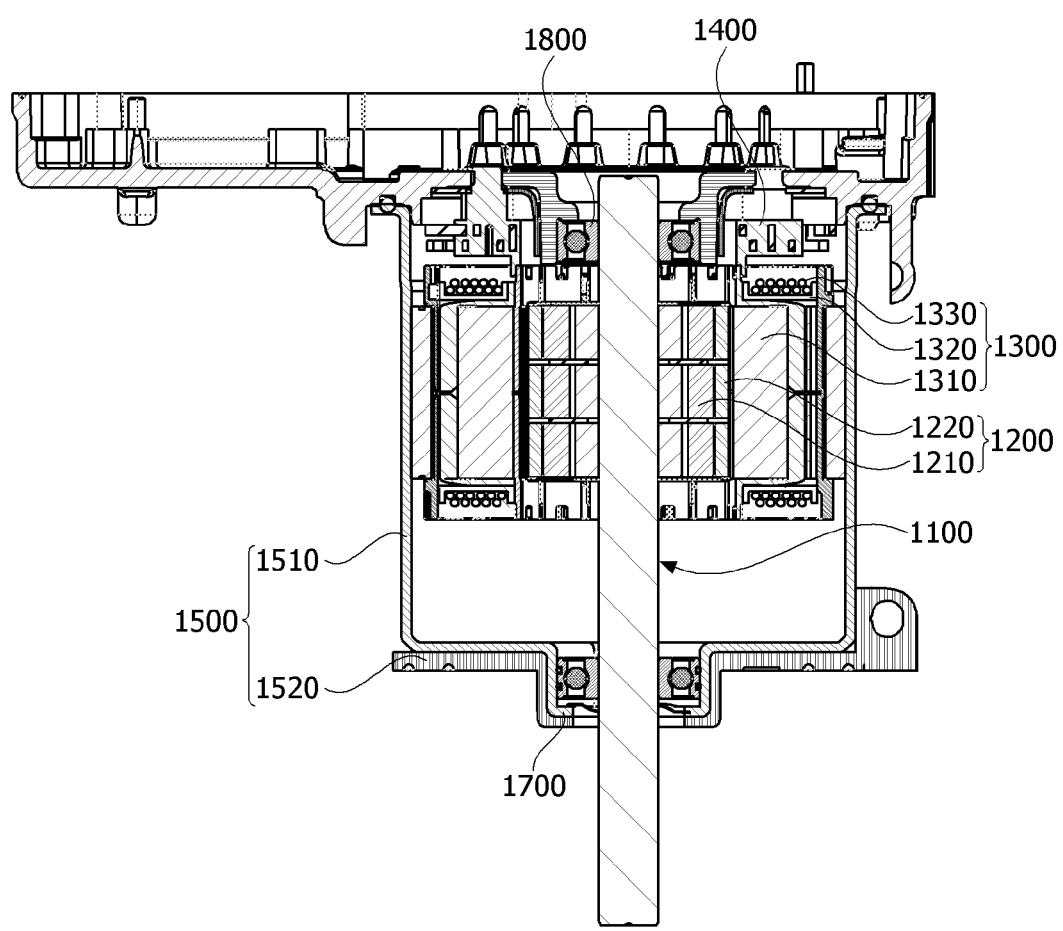

[FIG. 21]
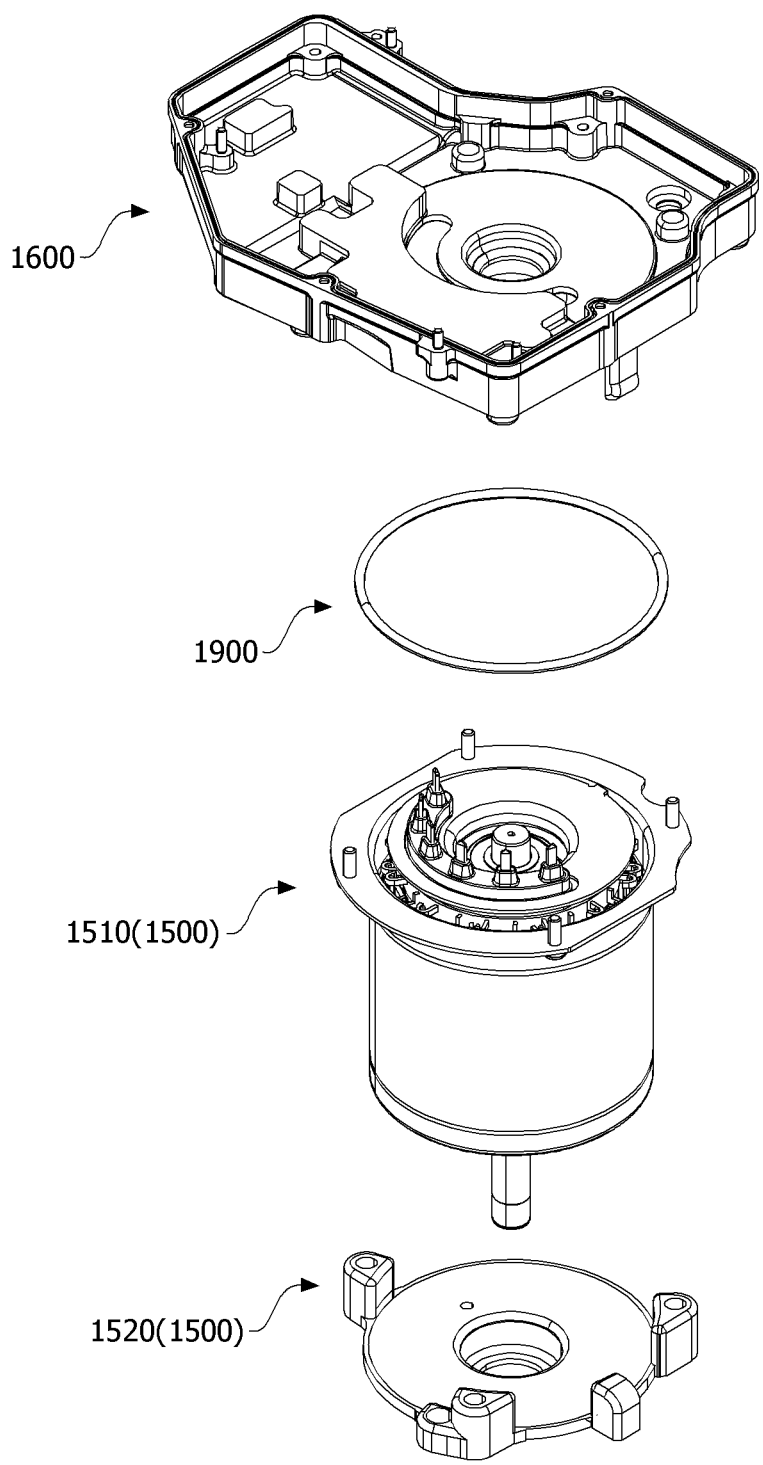

[FIG. 22]
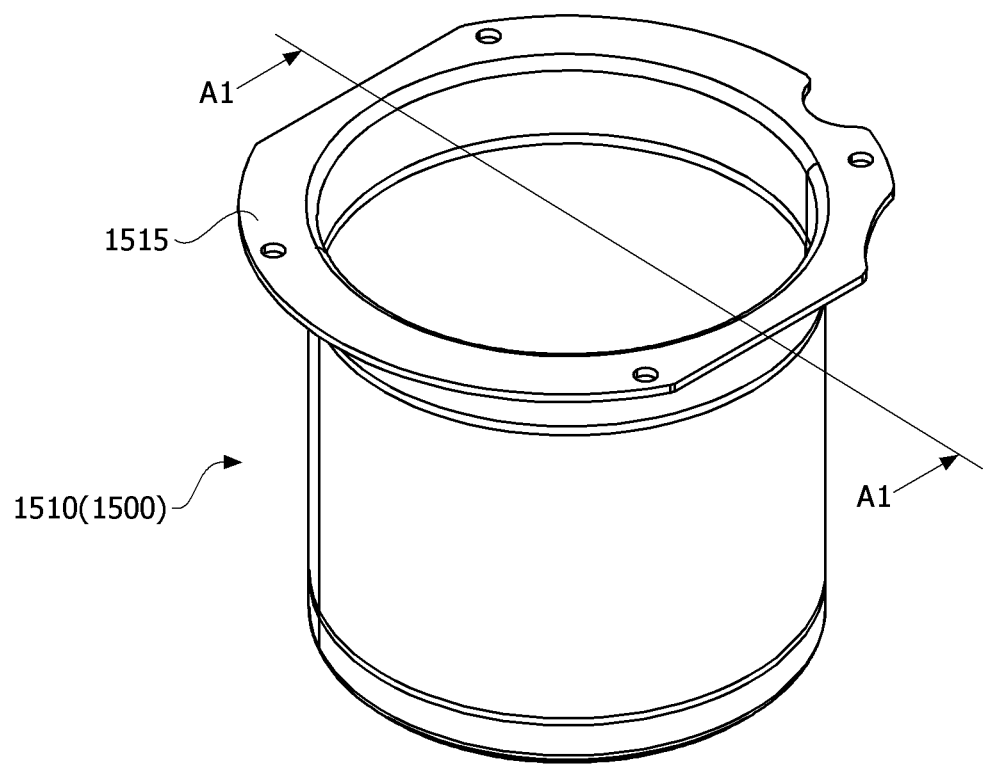

[FIG. 23]
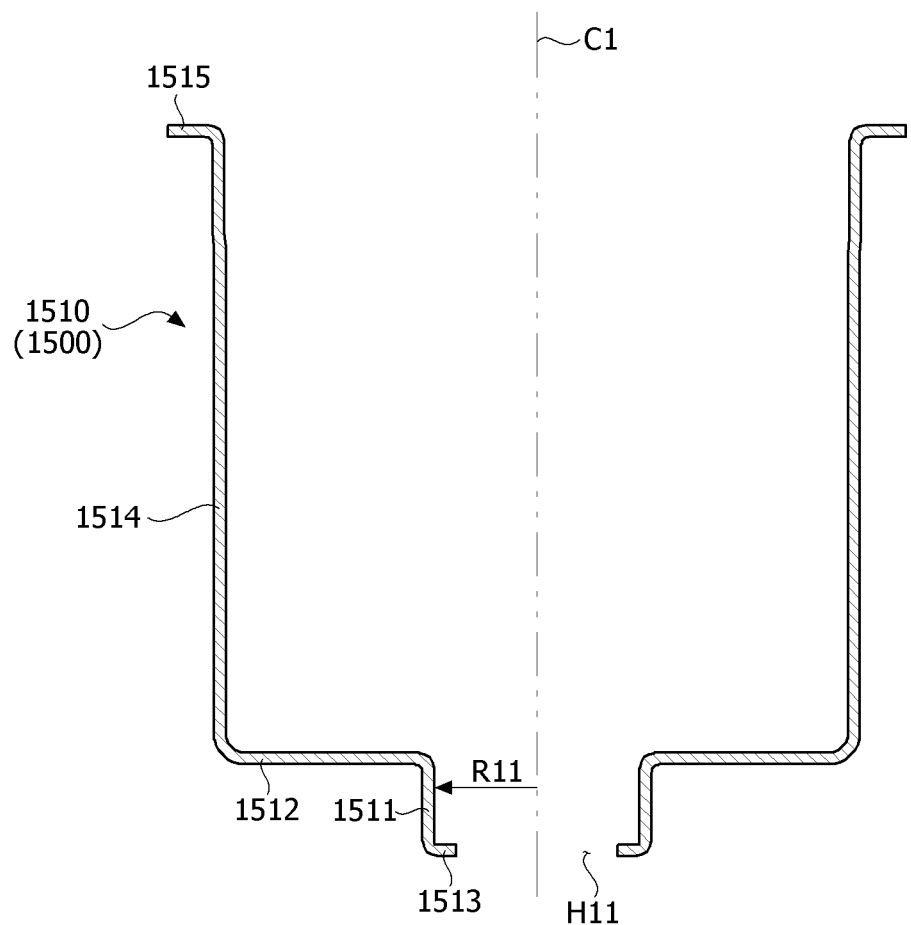

[FIG. 24]
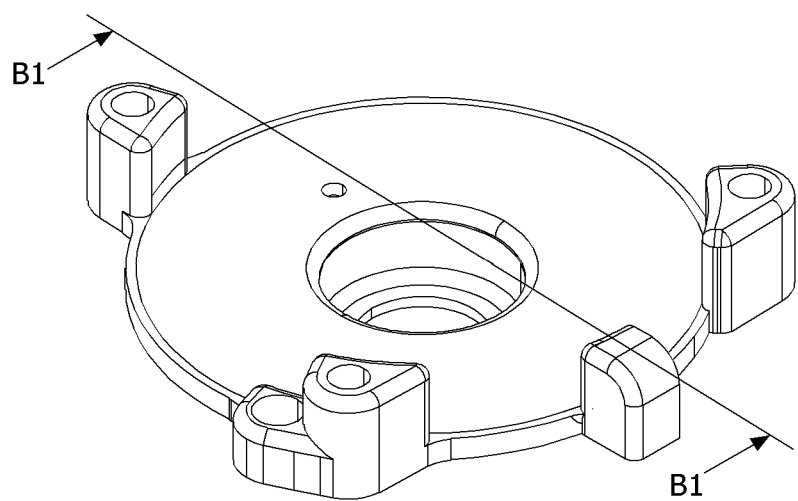

[FIG. 25]
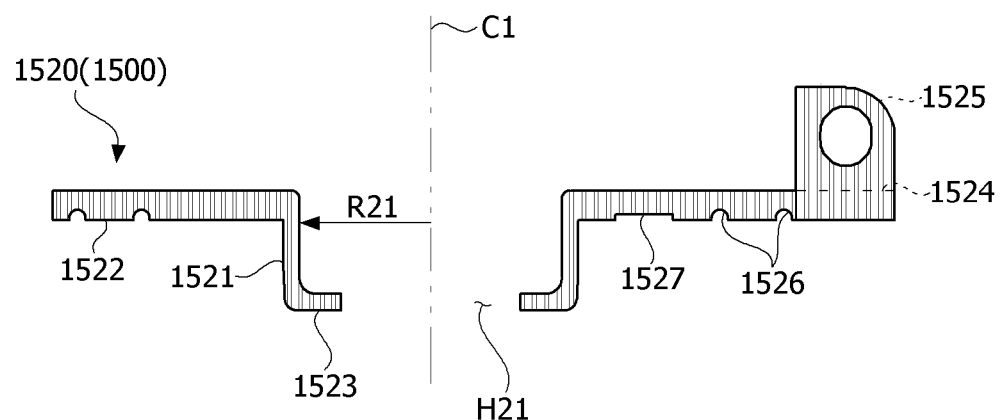

[FIG. 26]
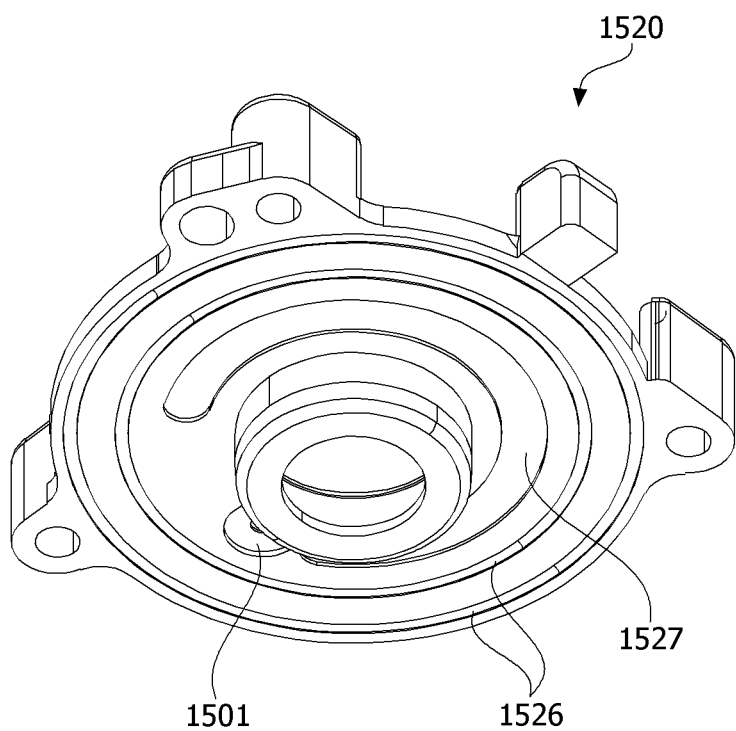

[FIG. 27]
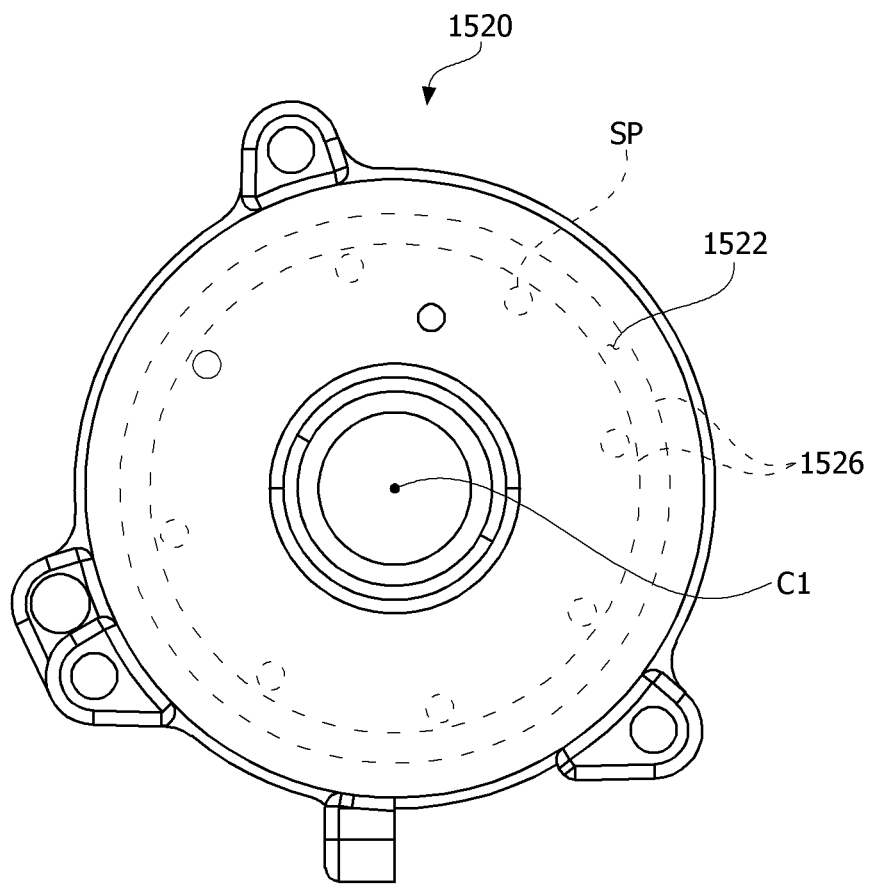

[FIG. 28]
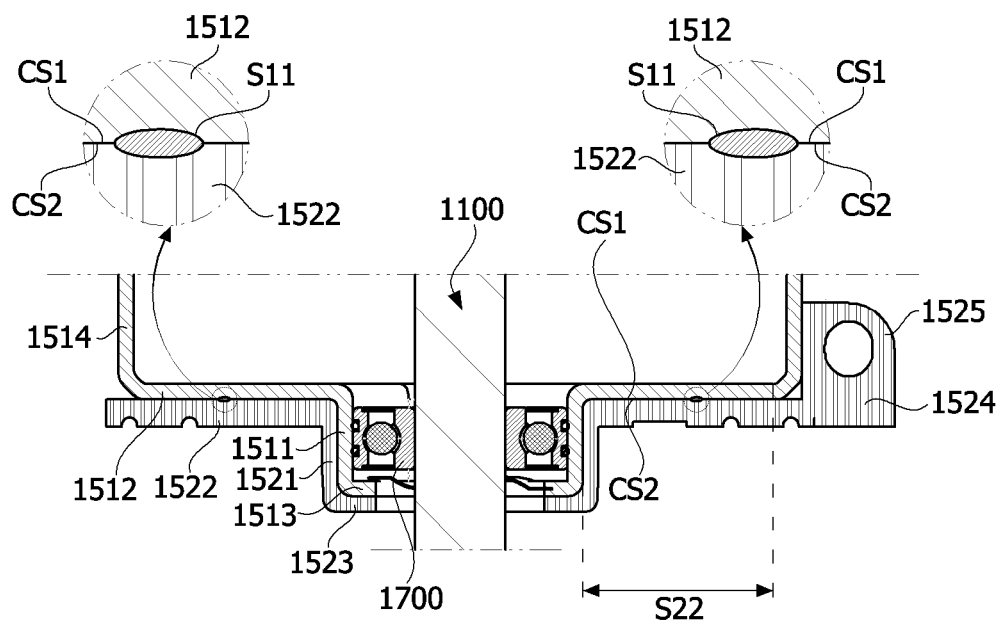

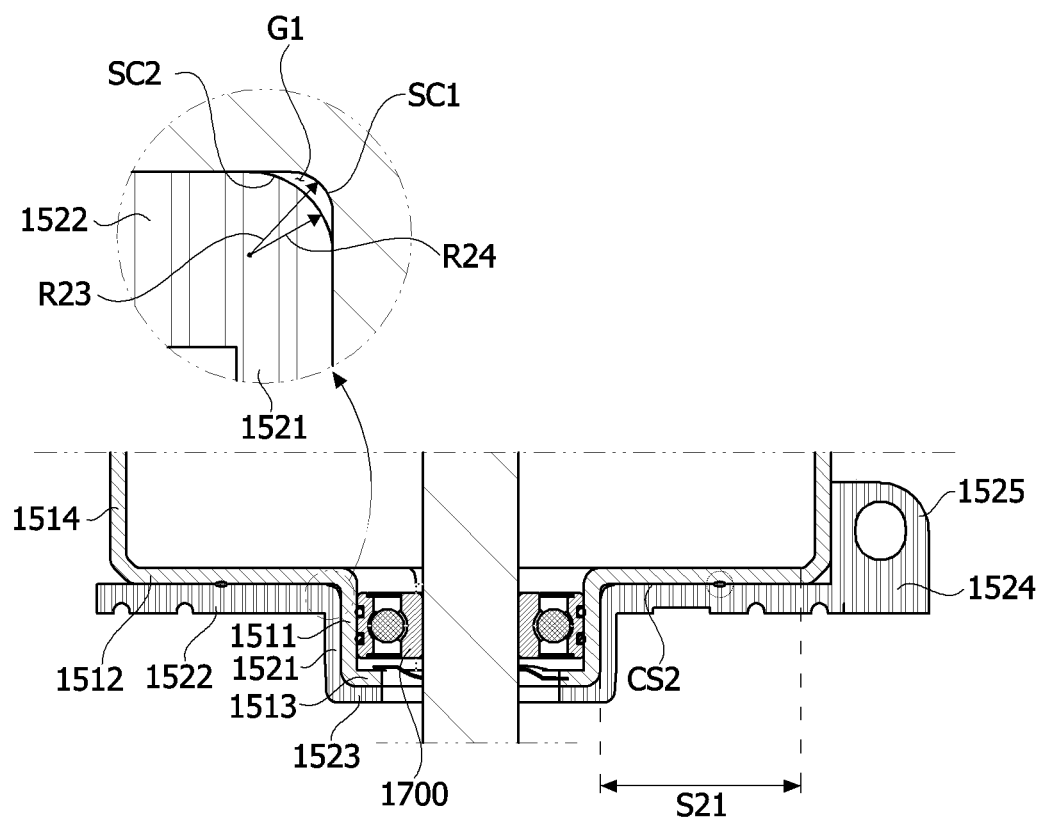
[FIG. 29]

[FIG. 30]
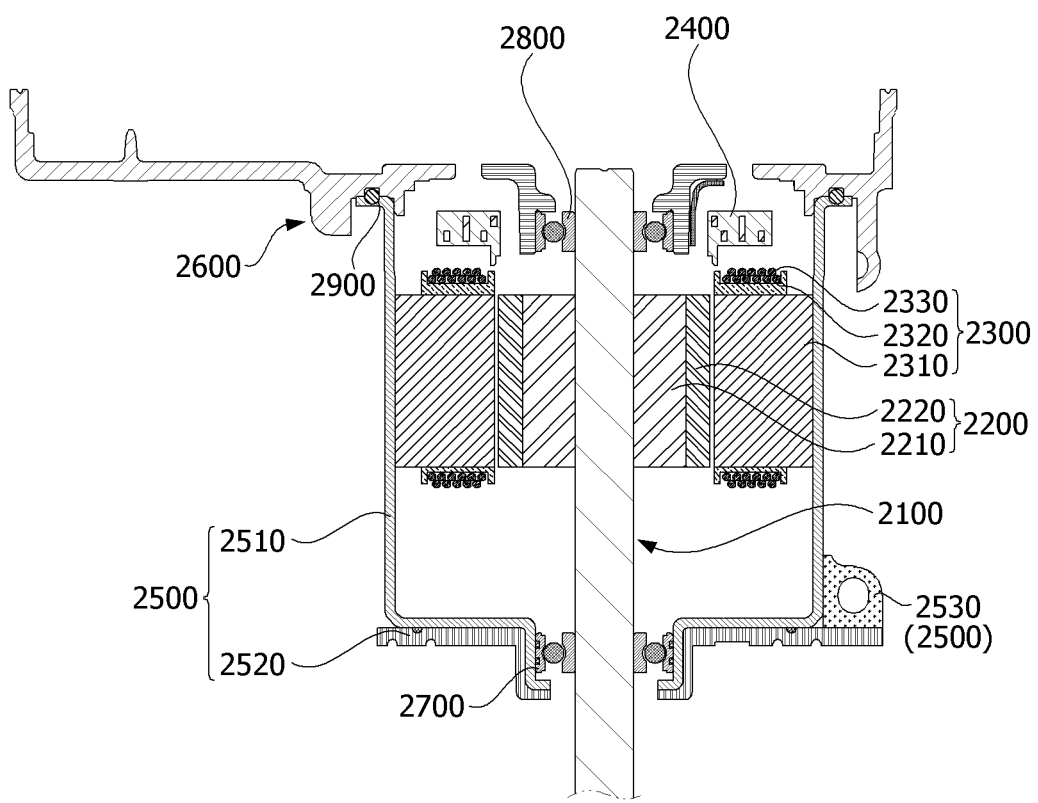

[FIG. 31]
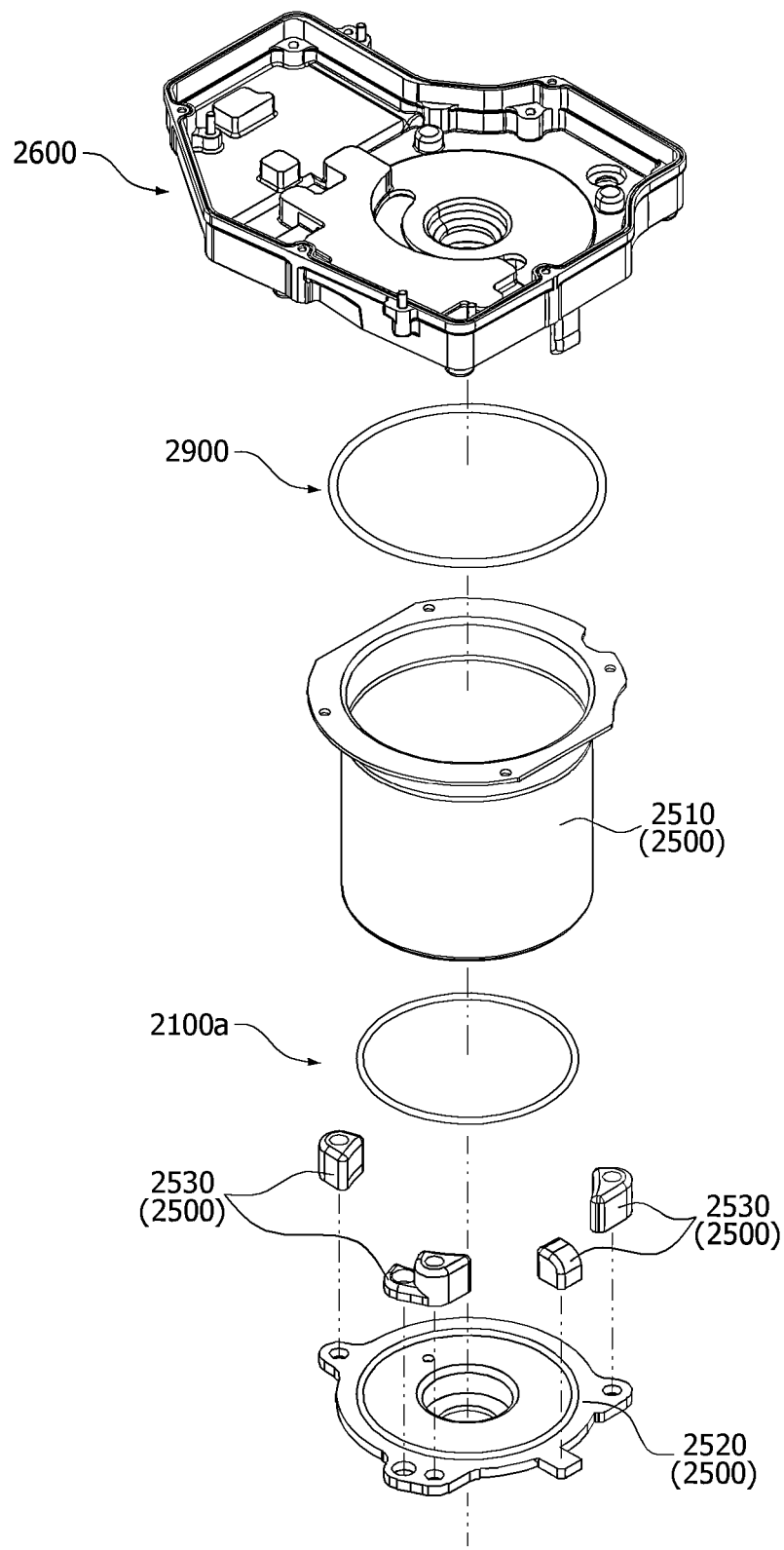

[FIG. 32]
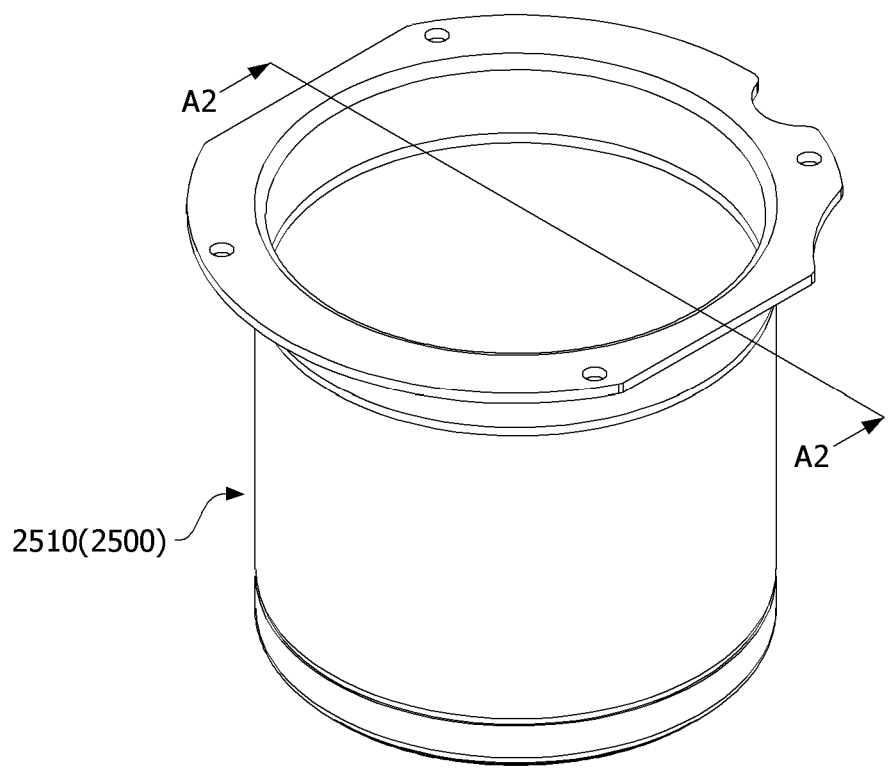

[FIG. 33]
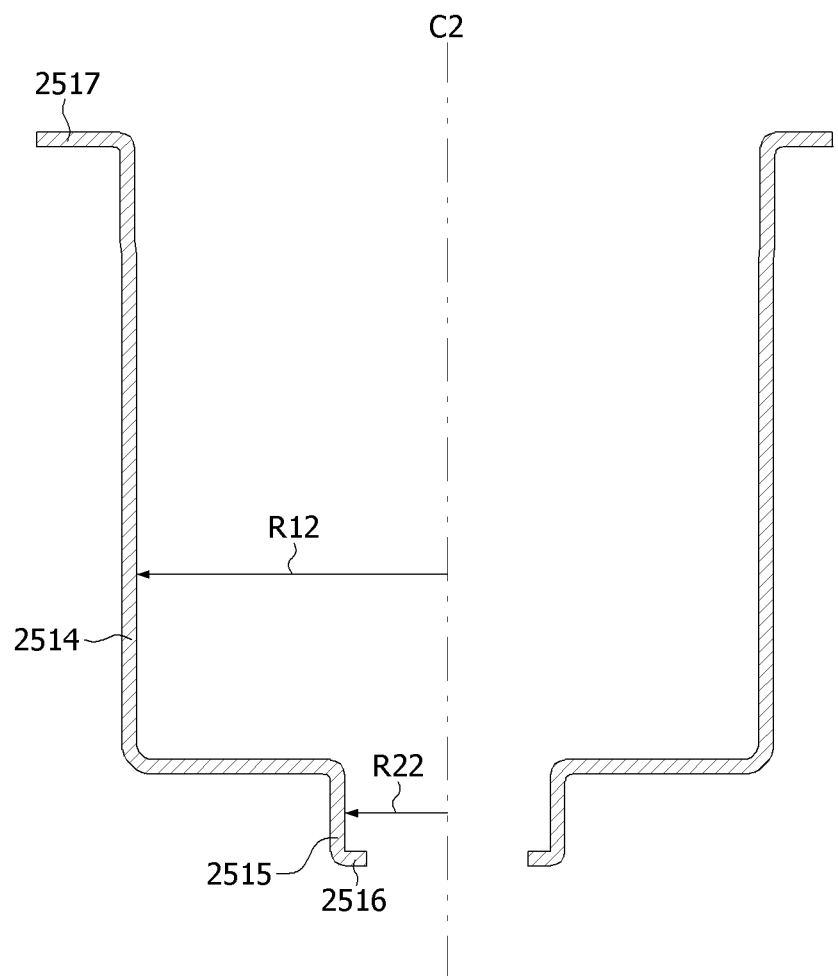

[FIG. 34]
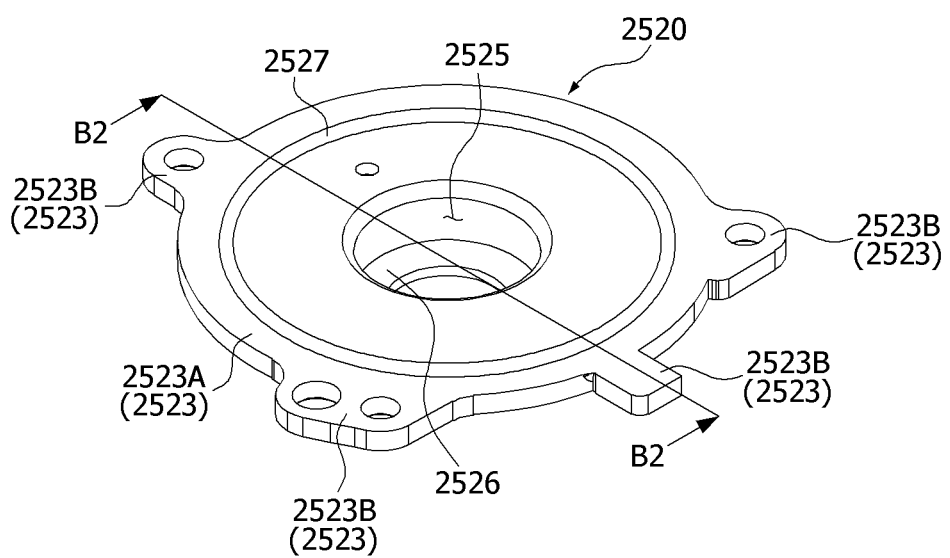

[FIG. 35]
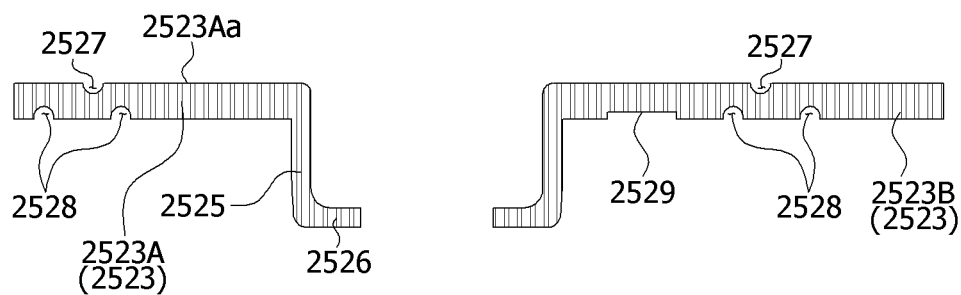

[FIG. 36]
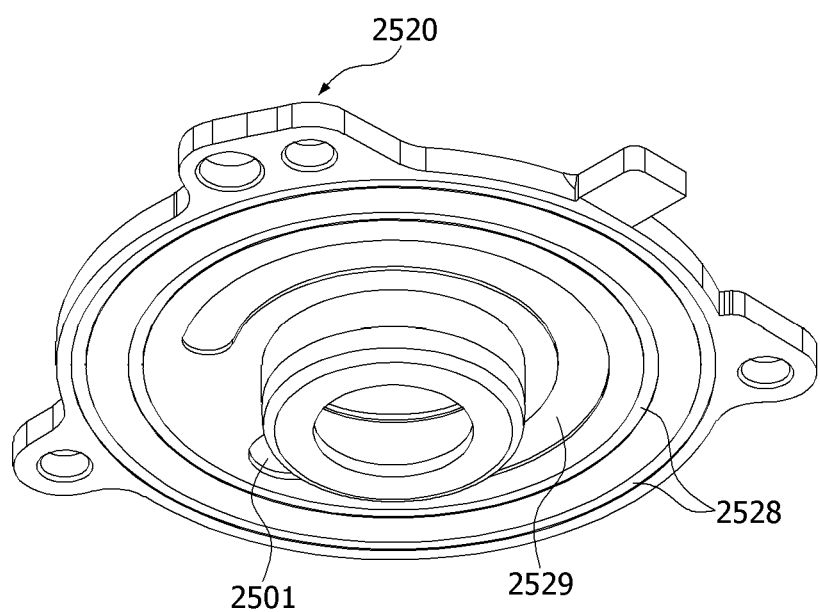

[FIG. 37]
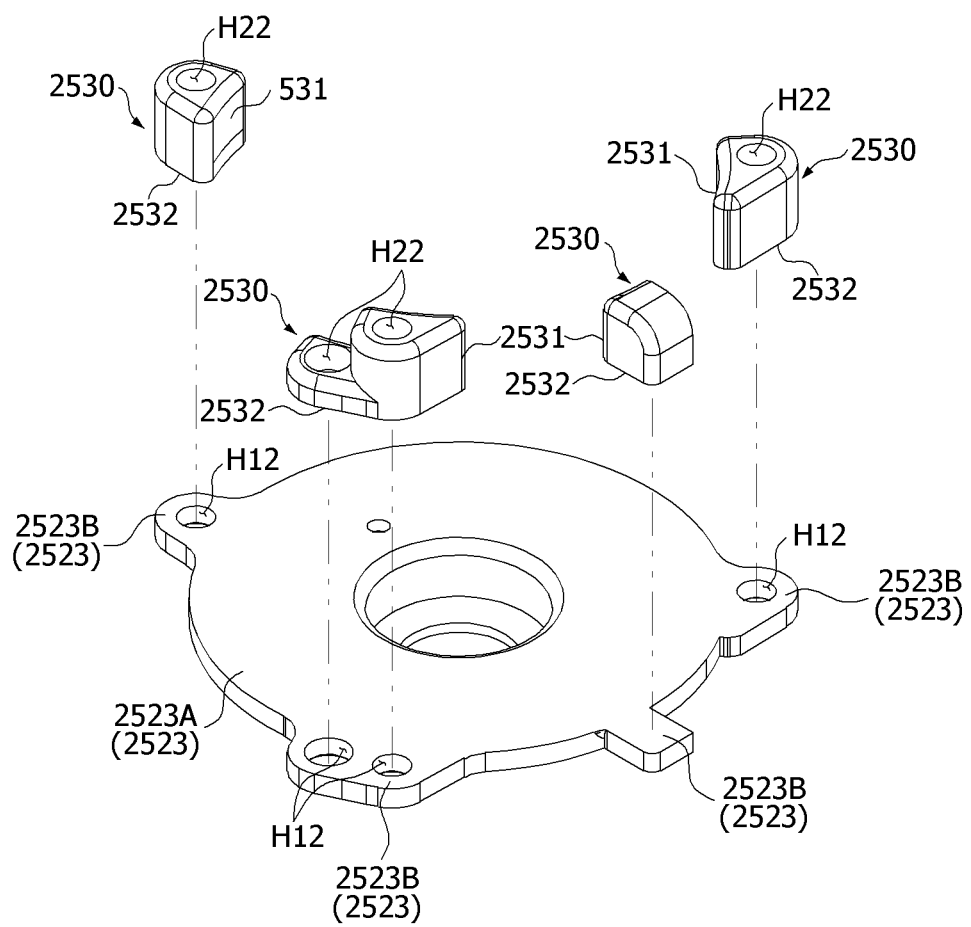

[FIG. 38]
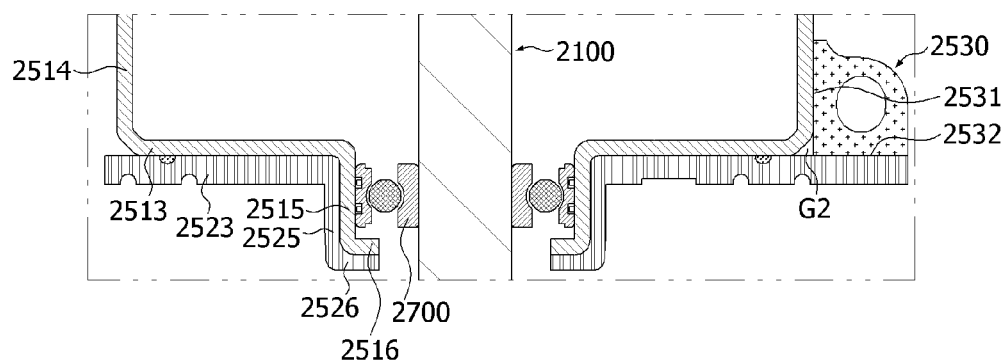

[FIG. 39]
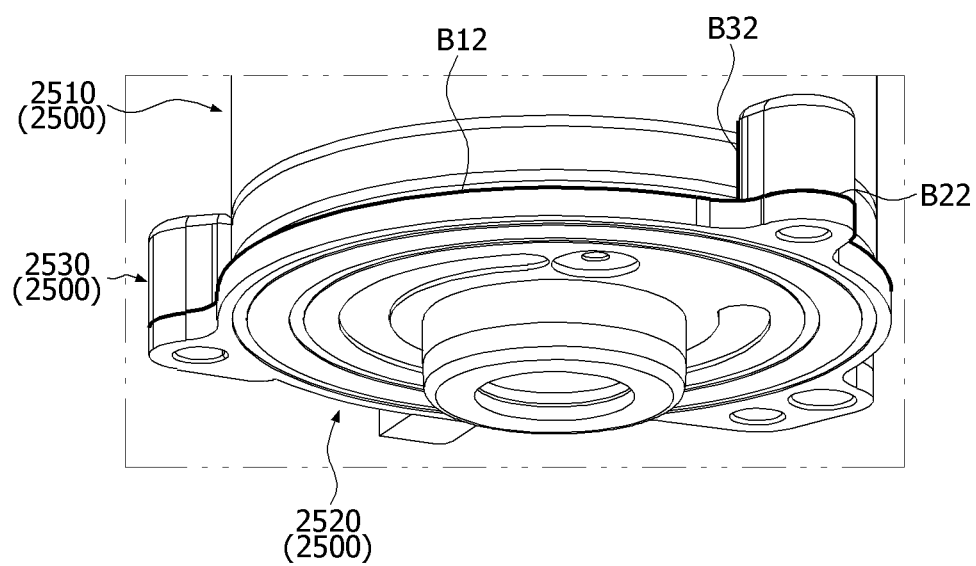

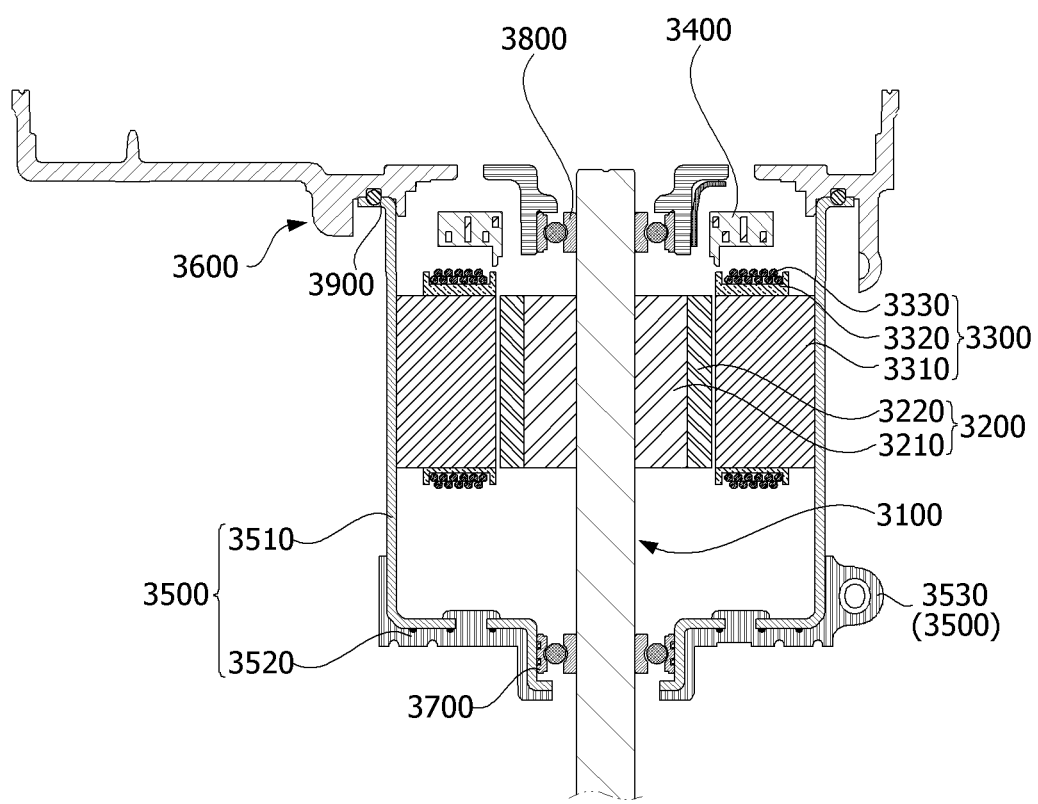
[FIG. 40]

[FIG. 41]
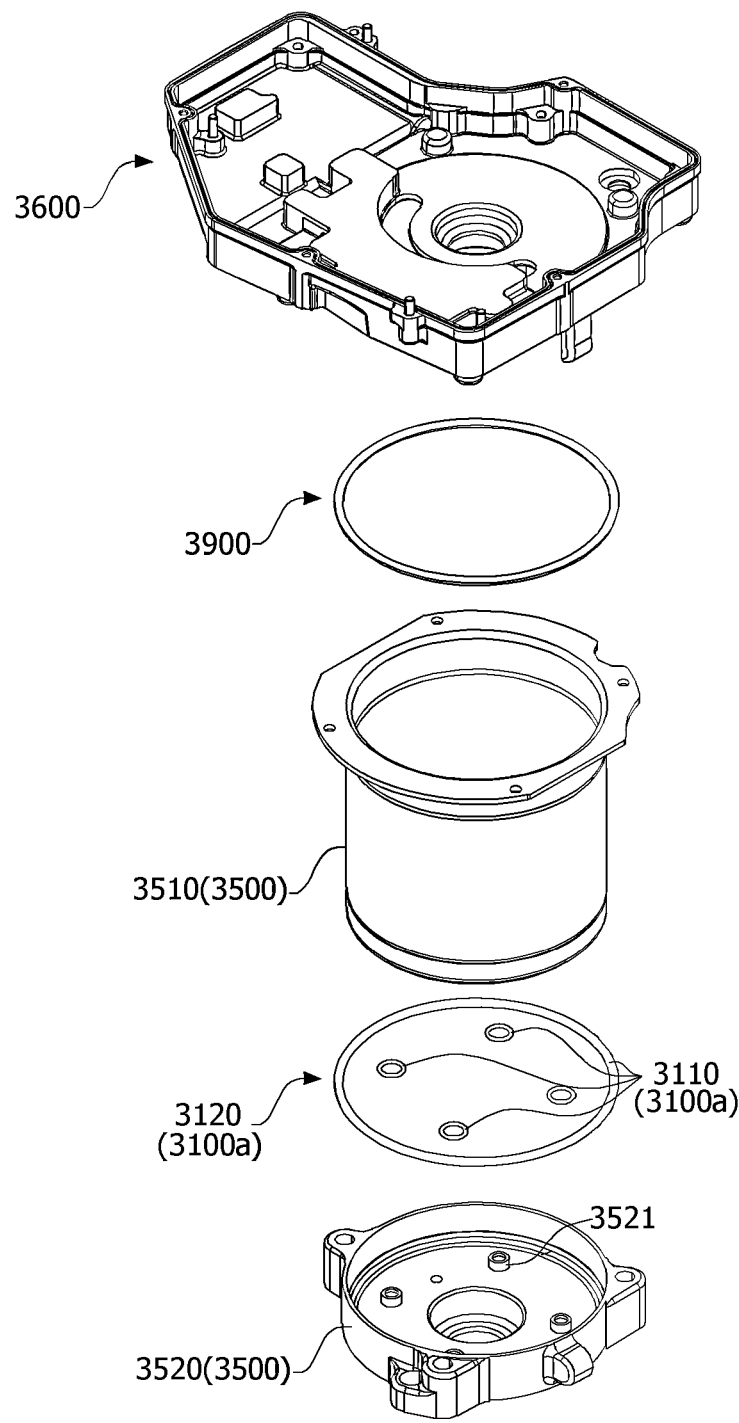

[FIG. 42]
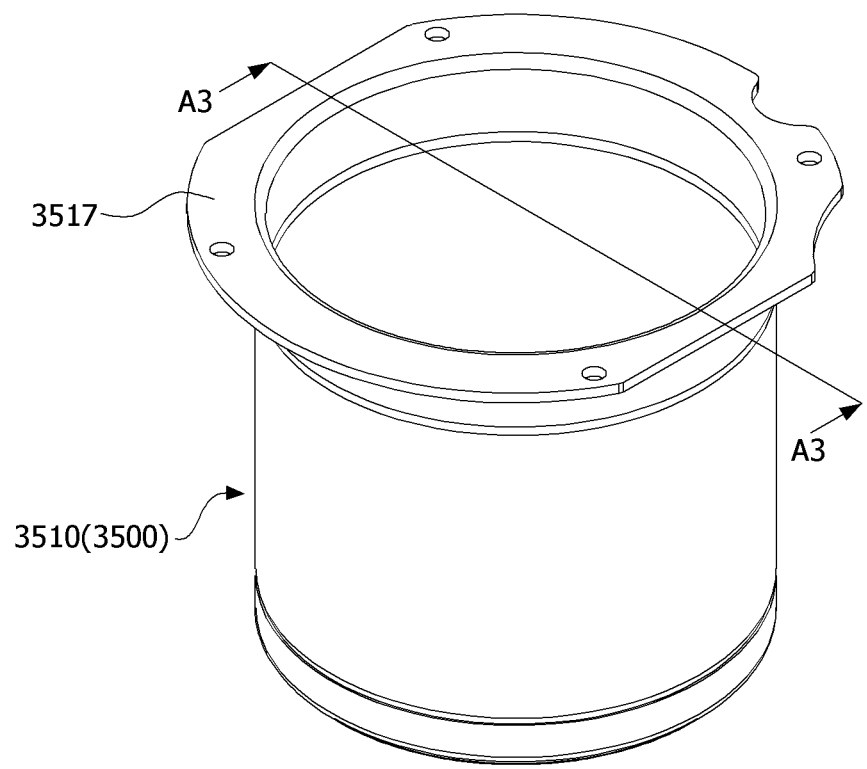

[FIG. 43]
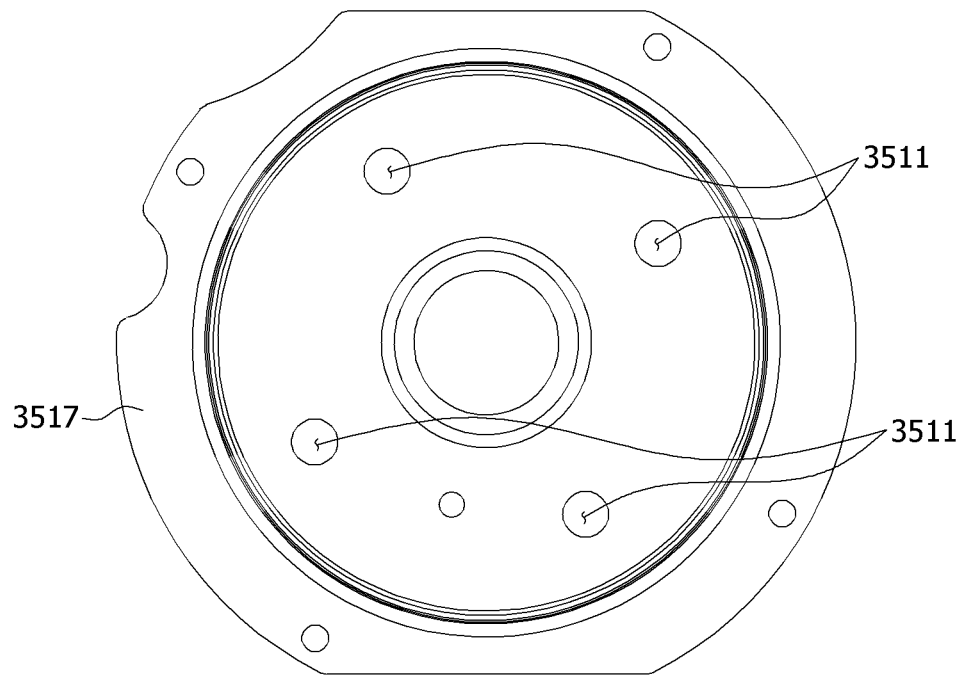

[FIG. 44]
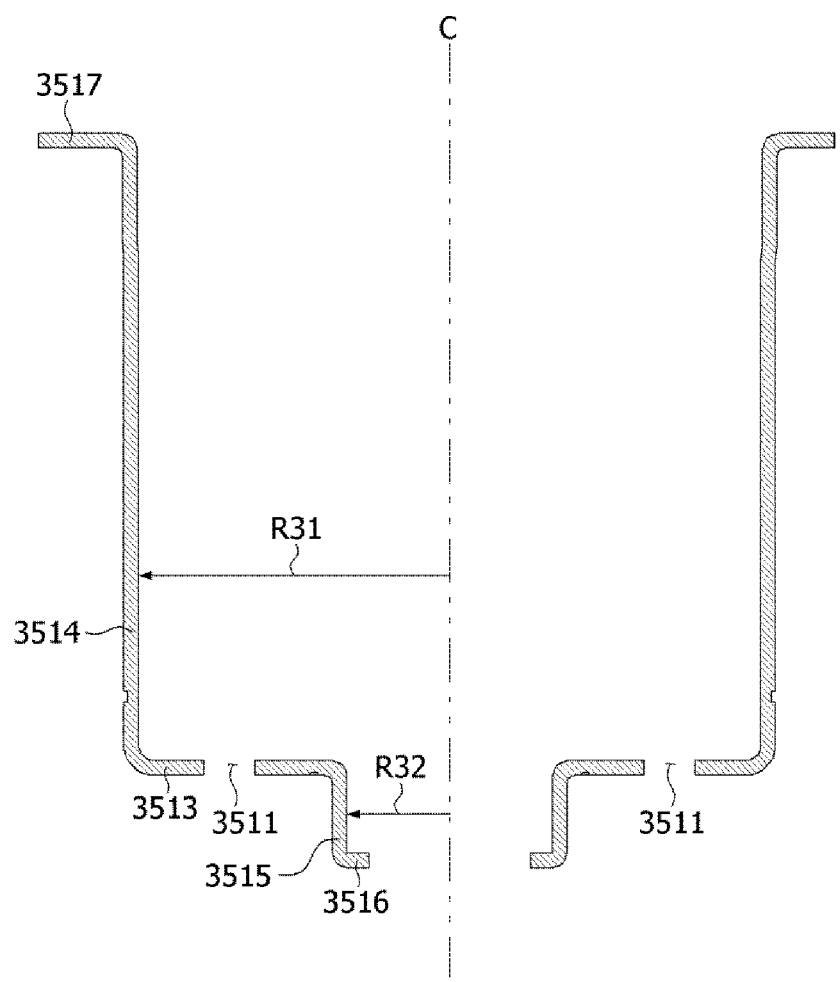

[FIG. 45]
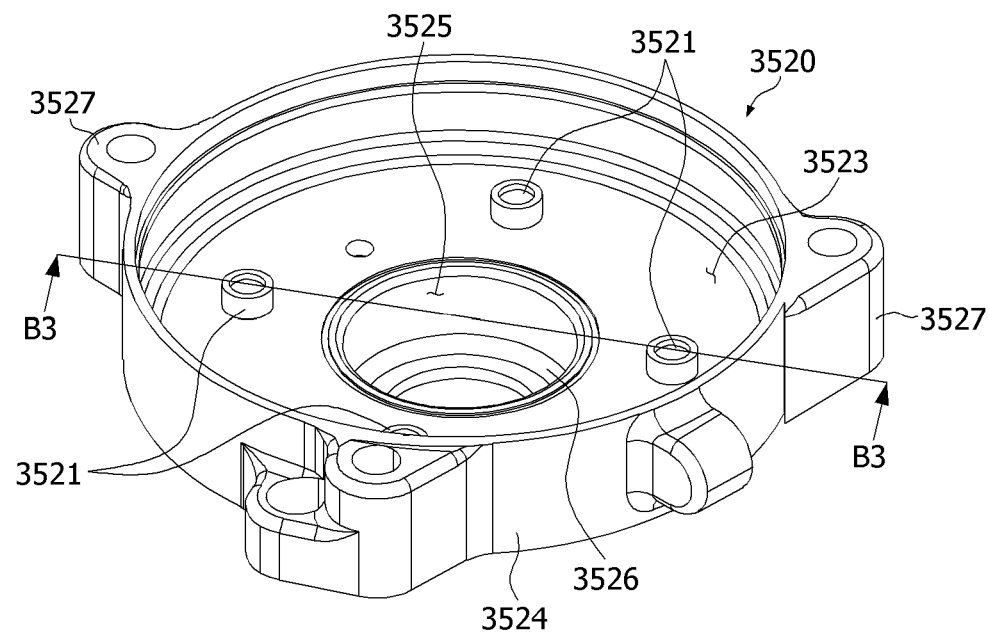

[FIG. 46]
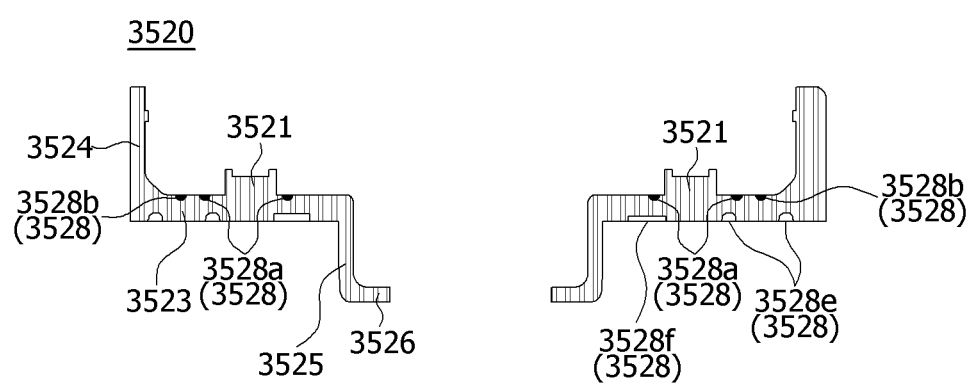

[FIG. 47]
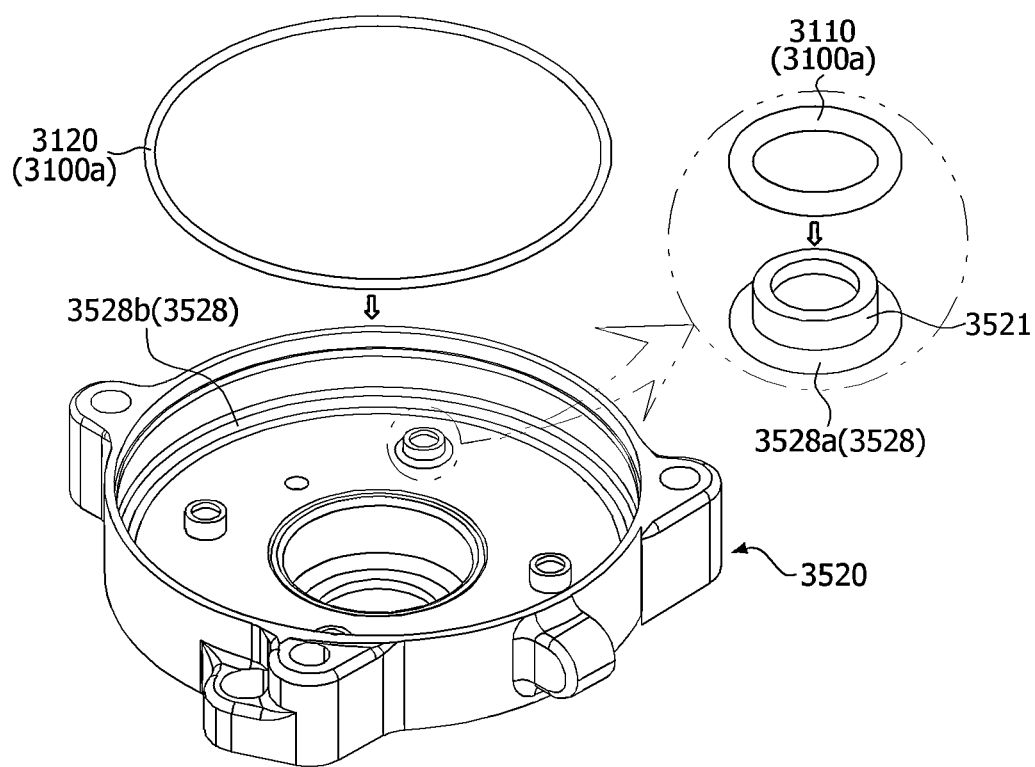

[FIG. 48]
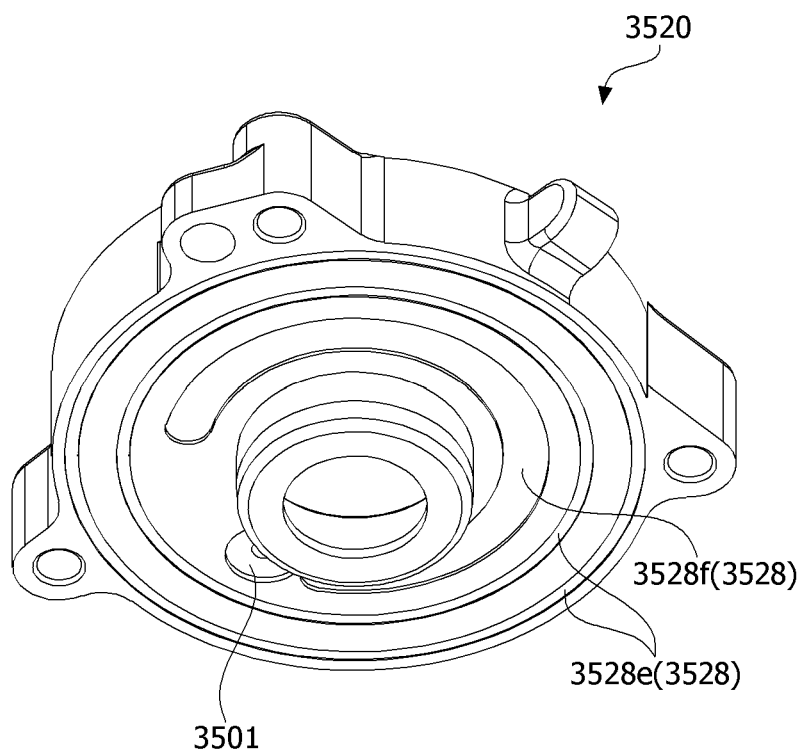

[FIG. 49]
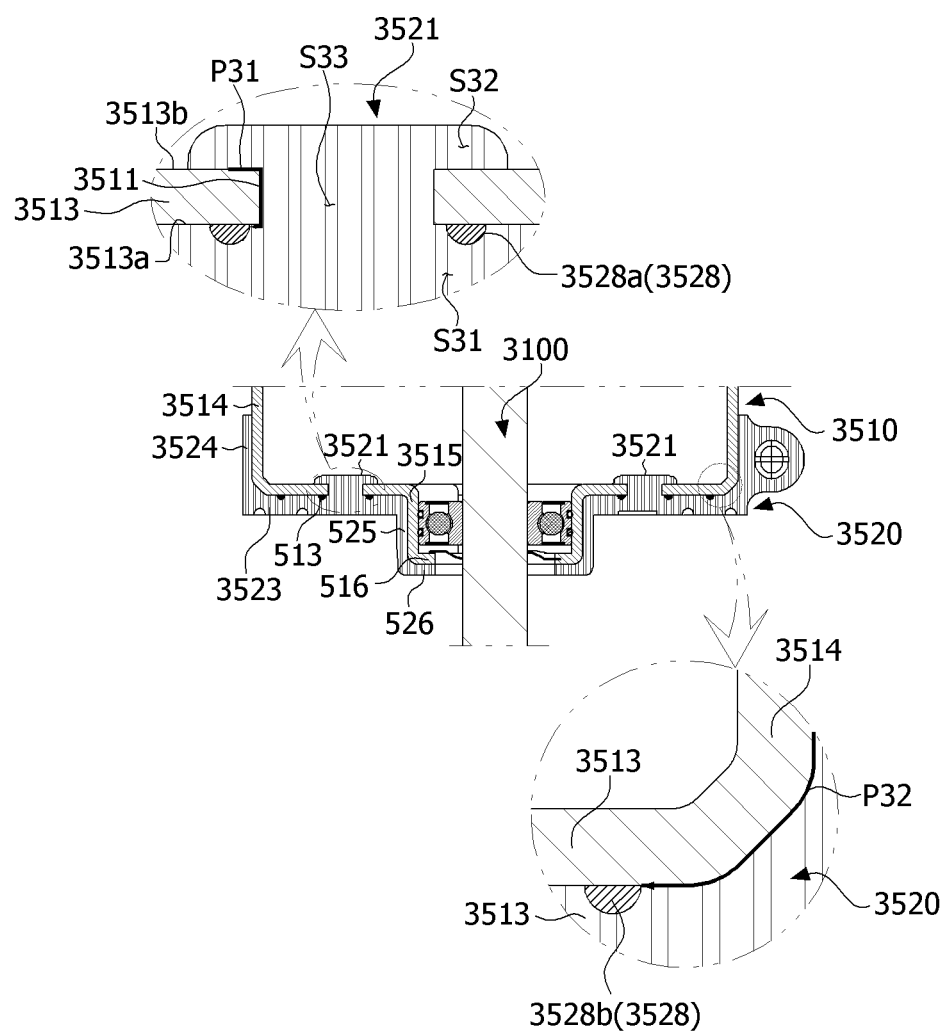

[FIG. 50]
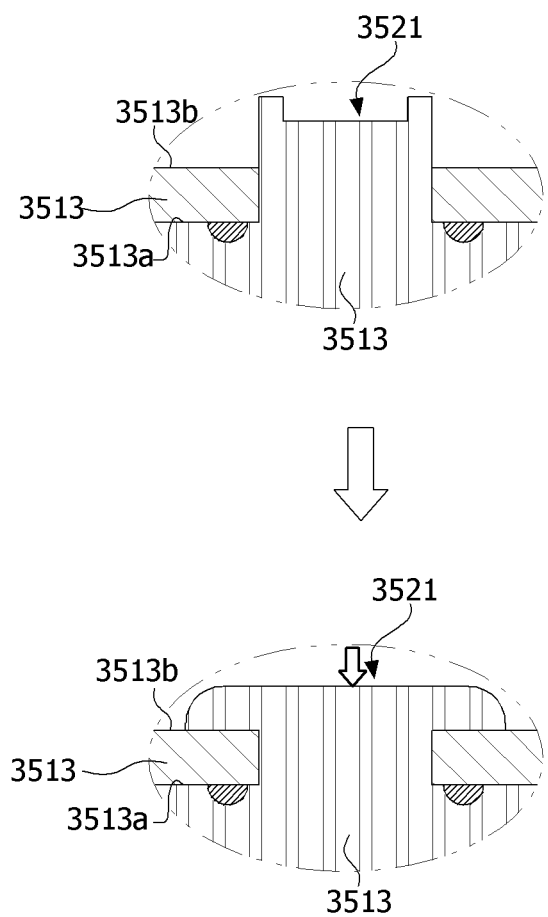

[FIG. 51]
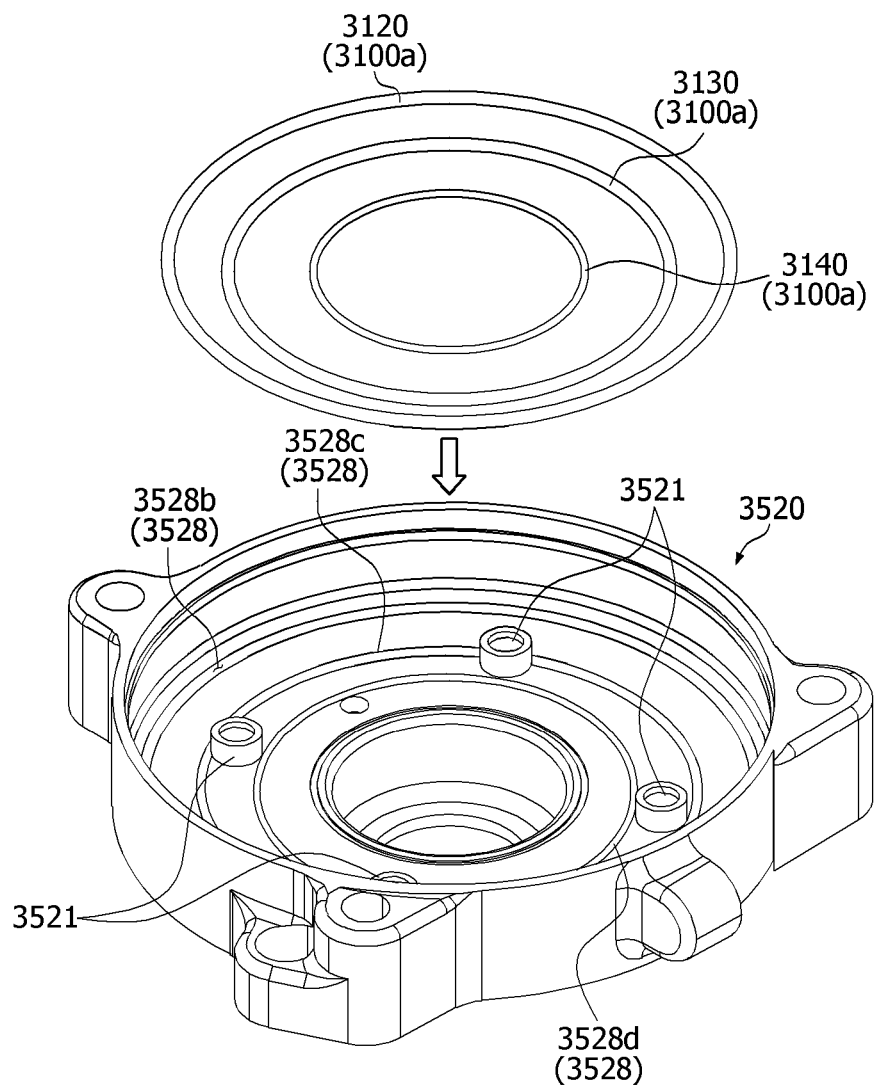

[FIG. 52]
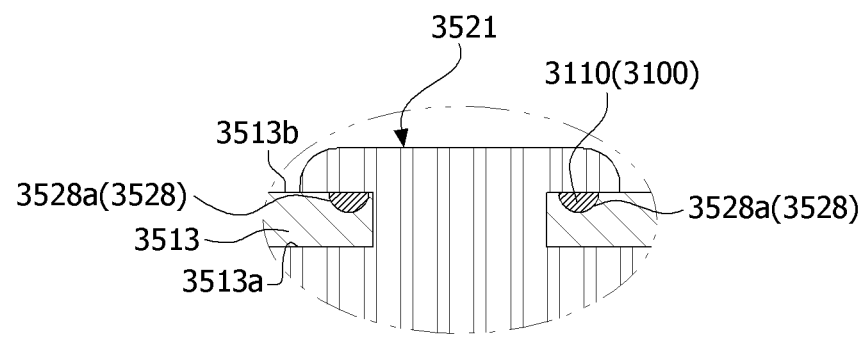

MOTOR

CROSS-REFERENCE TO RELATED PATENT APPLICATIONS

This application is a U.S. National Stage Application under 35 U.S.C. § 371 of PCT Application No. PCT/KR2021/004789, filed Apr. 16, 2021, which claims priority to Korean Patent Application Nos. 10-2020-0070299, filed Jun. 10, 2020, 10-2020-0070859, filed Jun. 11, 2020, 10-2020-0100648, filed Aug. 11, 2020 and 10-2020-0100649, filed Aug. 11, 2020, whose entire disclosures are hereby incorporated by reference.

TECHNICAL FIELD

The present invention relates to a motor.

BACKGROUND ART

Generally, in a motor, a rotor is rotated by an electromagnetic interaction between the rotor and a stator. In this case, a shaft connected to the rotor also rotates to generate a rotational driving force.

The rotor and the stator are accommodated in a housing. The housing is a hollow cylindrical member. A bearing plate for accommodating a bearing may be disposed in an end portion of one side of the housing, and a mounting structure to be connected to an external device may be provided in an end portion of the other side of the housing.

When a die casting process of injection-molding a molten metal into a mold, a housing including both of a bearing plate and a mounting structure may be molded. However, the housing manufactured through such a method has a problem of generating a crack.

DISCLOSURE

Technical Problem

Accordingly, an embodiment is intended to solve the above problems and directed to providing a motor capable of preventing the occurrence of a crack in a housing.

Objectives to be achieved by the present invention are not limited to the above-described objective, and other objectives which are not described above will be clearly understood by those skilled in the art through the following descriptions.

Technical Solution

One aspect of the present invention provides a motor including a housing, a stator disposed inside the housing, a rotor disposed inside the stator, and a shaft coupled to the rotor, wherein the housing includes a first housing and a second housing, the first housing includes a first sidewall having a first radius and a second sidewall having a second radius smaller than the first radius, the second housing includes a third sidewall in contact with the first sidewall and a fourth sidewall in contact with the second sidewall, an outer surface of the first sidewall includes a first coupling unit, and an inner surface of the third sidewall includes a second coupling unit coupled to the first coupling unit.

Another aspect of the present invention provides a motor including a housing, a stator disposed inside the housing, a rotor disposed inside the stator, and a shaft coupled to the rotor, wherein the housing includes a first housing and a second housing, the first housing includes a first region having a first radius and a second region having a second radius different from the first radius, the second housing includes a third region in contact with the first region and a fourth region in contact with the second region, at least any one of the first region and the second region includes a first coupling unit, and at least any one of the third region and the fourth region includes a second coupling unit coupled to the first coupling unit.

Still another aspect of the present invention provides a motor including a housing and a stator disposed inside the housing, wherein the housing includes a first housing and a second housing, the first housing includes a first region and a second region, the second housing includes a third region coupled to the first region and a fourth region coupled to the second region, the first region includes a first groove, the second region includes a second groove disposed at a different height from the first groove in an axial direction, the third region includes a first protrusion corresponding to the first groove, and the fourth region includes a second protrusion corresponding to the second groove.

Yet another aspect of the present invention provides a motor including a housing, a stator disposed inside the housing, a rotor disposed inside the stator, and a shaft coupled to the rotor, wherein the housing includes a first housing and a second housing, the first housing includes a first region having a first radius and a second region having a second radius smaller than the first radius, the second housing includes a third region coupled to the first region and a fourth region coupled to the second region, and the second housing is fixed to the first housing.

Yet another aspect of the present invention provides a motor including a housing, a stator disposed inside the housing, a rotor disposed inside the stator, and a shaft coupled to the rotor, wherein the housing includes a first housing and a second housing, each of which includes a hole through which the shaft passes, a fifth region in which the first housing and the second housing overlap in an axial direction, and a sixth region and a seventh region in which the first housing and the second housing overlap in a direction perpendicular to the axial direction, and in the fifth region, a part of the first housing and a part of the second housing are disposed to overlap in the axial direction.

An inner surface of the first sidewall may be in contact with the stator, and an inner surface of the second sidewall may be in contact with an outer wheel of a first bearing supporting the shaft.

A plurality of first grooves may be disposed at predetermined intervals in a circumferential direction of the first housing.

The plurality of first groove may be divided and disposed along a first circumference and a second circumference about an axial center.

The first grooves disposed on the first circumference and the first grooves disposed on the second circumference may be disposed to be misaligned with each other in the circumferential direction, and parts of the first grooves disposed on the first circumference and parts of the first grooves disposed on the second circumference may be disposed to overlap in the axial direction.

The first grooves disposed on the first circumference and the second grooves disposed on the second circumference are disposed to be misaligned with each other in the circumferential direction, and parts of the first grooves disposed on the first circumference and parts of the second grooves disposed on the second circumference may be disposed to overlap in the circumferential direction.

The first housing may include a fifth sidewall bent from the second sidewall toward the shaft, the second housing may include a sixth sidewall bent from the fourth sidewall toward the shaft, and an outer surface of the fifth sidewall and an inner surface of the sixth sidewall may be in contact with each other.

An outer diameter of the first sidewall may be smaller than an outer diameter of the third sidewall and greater than an outer diameter of the fourth sidewall, and an outer diameter of the second sidewall may be smaller than the outer diameter of the fourth sidewall.

The first housing may include a third protrusion protruding from the inner surface of the first sidewall, and the third protrusion may be disposed to correspond to the first groove.

An inner surface of the third sidewall may be in contact with an outer surface of the first sidewall, an inner surface of the fourth sidewall may be in contact with a part of the outer wheel of the first bearing, and the inner surface of the second sidewall may be in contact with the remaining part of the outer wheel the first bearing.

The inner surface of the third sidewall may be in contact with the outer surface of the first sidewall, the fourth sidewall may include a eighth region in contact with an outer surface of the second wall and a ninth region coupled to an outer surface of the first bearing, and the eighth region and the ninth region may be disposed to be stepped.

Yet another aspect of the present invention provides a motor including a housing, a stator disposed inside the housing, a rotor disposed inside the stator, and a shaft coupled to the rotor, wherein the housing includes a first housing and a second housing, the first housing includes a first wall having a first radius and a second wall disposed to be bent from the first wall in a radial direction, the second housing includes a third wall having a second radius greater than the first radius and a fourth wall disposed to be bent from the third wall in the radial direction, and the first wall is in contact with the third wall.

Yet another aspect of the present invention provides a motor including a housing, a stator disposed inside the housing, a rotor disposed inside the stator, and a shaft coupled to the rotor, wherein the housing includes a first housing and a second housing, each of which includes a hole through which the shaft passes, the first housing includes a first contact surface, the second housing includes a second contact surface in contact with the first contact surface, and a plurality of first regions, which are melted and solidified, are disposed between the first contact surface and the second contact surface.

A plurality of welding parts may be disposed on the second wall or the fourth wall.

The first wall and the second wall may be connected by a first curved surface, the third wall and the fourth wall may be connected by a second curved surface, and a radius of curvature of the first curved surface may be smaller than a radius of curvature of the second curved surface.

The first wall and the second wall may be connected by the first curved surface, the third wall and the fourth wall may be connected by the second curved surface, and a space may be disposed between the first curved surface and the second curved surface.

The motor may include a first bearing supporting the shaft, and the first wall may be in contact with the bearing.

The second housing may include a sixth wall disposed to be bent from the third wall in the radial direction, and the sixth wall may be in contact with the fifth wall.

An annular first groove may be disposed on an outer surface of the third wall

The first housing may include a seventh wall bent from the second wall in an axial direction, the fourth wall may include a first extension part extending from an edge of the fourth wall in the radial direction and a second extension part extending from the first extension part in the axial direction, the first extension part and the second extension part may be disposed not to overlap the first housing in the axial direction, the first extension part may be disposed to overlap the first wall in a direction perpendicular to the axial direction, and the second extension part may be disposed to overlap the seventh wall in the direction perpendicular to the axial direction.

The motor may include a second region in which the first contact surface and the second contact surface overlap in the axial direction, and the first region may be disposed in the second region Yet another aspect of the present invention provides a motor including a shaft, a rotor coupled to the shaft, a stator disposed to correspond to the rotor, and a housing configured to accommodate the stator, wherein the housing includes a first housing, a second housing coupled to the first housing, and a third housing coupled to the second housing, the first housing and the third housing are disposed to overlap in a radial direction, the second housing and the third housing are disposed to overlap in an axial direction, and a first bead disposed on a boundary of the first housing and the second housing and a second bead disposed on a boundary of the second housing and the third housing are consecutively disposed.

Yet another aspect of the present invention provides a motor including a shaft, a rotor coupled to the shaft, a stator disposed to correspond to the rotor, and a housing configured to accommodate the stator, wherein the housing includes a first housing, a second housing, and a third housing, the first housing includes a first sidewall having a first radius, a second sidewall having a second radius smaller than the first radius, and a first base disposed between the first sidewall and the second sidewall, the second housing includes a third sidewall in contact with the first sidewall and a second base which is connected to the third sidewall and is in contact with the first base, and the third housing includes a fourth sidewall in contact with an outer surface of the first sidewall and a third base in contact with a part of the second base.

A third bead may be disposed on a boundary of the third housing and an outer surface of the first housing.

The first bead may be disposed in a circumferential direction, and the second bead may be disposed in the axial direction.

The second housing may include a first part overlapping the first housing and a second part which extends from the first part and does not overlap the first housing, and the second part may be disposed to overlap the third housing.

A cross-sectional shape of the second part may correspond to a cross-sectional shape of the third housing.

At least any one of a plurality of second housings may include a first hole, and the third housing may include a second hole corresponding to the first hole.

The motor may further include an annular sealing member disposed between the first base and the second base, and a radius of the sealing member may be smaller than a radius of the first sidewall.

The second housing may include a first groove disposed in an inner surface, and the sealing member may be disposed in the first groove.

A space may be formed between an outer surface of a corner of the first housing, the inner surface of the second housing, and an inner surface of the third housing.

Yet another aspect of the present invention provides a motor including a shaft, a rotor coupled to the shaft, a stator disposed to correspond to the rotor, and a housing configured to accommodate the stator, wherein the housing includes a first housing and a second housing, the first housing includes a first sidewall having a first radius, a second sidewall having a second radius smaller than the first radius, and a first base disposed between the first sidewall and the second sidewall, the second housing includes a third sidewall in contact with the first sidewall, a fourth sidewall in contact with the second sidewall, and a second base disposed between the third sidewall and the fourth sidewall, the first base includes a hole, the second base includes a protrusion corresponding to the hole, a part of the protrusion is in contact with an inner surface of the first base, and a sealing member is disposed between the first base and the second base.

Yet another aspect of the present invention provides a motor including a shaft, a rotor coupled to the shaft, a stator disposed to correspond to the rotor, and a housing configured to accommodate the stator, wherein the housing includes a first housing and a second housing, the first housing includes a first sidewall having a first radius, a second sidewall having a second radius smaller than the first radius, and a first base disposed between the first sidewall and the second sidewall, the second housing includes a third sidewall in contact with the first sidewall, a fourth sidewall in contact with the second sidewall, and a second base disposed between the third sidewall and the fourth sidewall, the second base includes a first region in contact with an outer surface of the first base, a second region in contact with an inner surface of the first base, and a third region which passes through the first base and connects the first region and the second region, and a sealing member is disposed between the first base and the second base.

The sealing member may include a first sealing member disposed along a circumference of the hole and a second sealing member disposed along a circumference of the second sidewall.

The second sealing member may be disposed outside the first sealing member in a radial direction.

The first sealing member may be disposed between the outer surface of the first base and the second base.

The first sealing member may be disposed between the inner surface of the first base and the second base.

The sealing member may include a third sealing member and a fourth sealing member having a radius smaller than a radius of the third sealing member, and the protrusion may be disposed between the third sealing member and the fourth sealing member in the radial direction.

The second base may include a groove in which the sealing member is disposed, the groove may include a first groove and a second groove, the first groove may be disposed to correspond to the circumference of the hole, and the second groove may be disposed to correspond to the circumference of the second sidewall.

The groove may include a third groove and a fourth groove having a radius smaller than a radius of the third groove, and the protrusion may be disposed between the third groove and the fourth groove in the radial direction.

The first groove may be disposed in the inner surface of the first base in contact with the second base.

Advantageous Effects

According to embodiments, an advantageous effect of preventing the occurrence of a crack in a housing is provided by differentiating a method of manufacturing an end portion of one side and an end portion of the other side of the housing and a method of manufacturing a cylinder of the housing for accommodating a rotor and a stator.

According to the embodiments, an advantageous effect of reducing a manufacturing process is provided by differentiating the method of manufacturing the end portion of one side and the end portion of the other side of the housing and the method of manufacturing the cylinder of the housing for accommodating the rotor and the stator.

According to the embodiments, an advantageous effect of preventing water or foreign materials from being introduced through a gap between a first housing and a second housing is provided.

According to the embodiments, there is an advantage of reducing the manufacturing process by providing a third housing separated from the second housing and forming a groove, into which a sealing member is inserted, in the second housing in a die casting process without performing a postprocess.

DESCRIPTION OF DRAWINGS

FIG. 1 is a side cross-sectional view illustrating a motor according to an embodiment.

FIG. 2 is an exploded view illustrating the motor illustrated in FIG. 1.

FIG. 3 is a perspective view illustrating a first housing.

FIG. 4 is a side cross-sectional view illustrating the first housing along line A-A of FIG. 3 illustrated in FIG. 3.

FIG. 5 is a view illustrating another arrangement of first grooves.

FIG. 6 is a view illustrating another arrangement of the first grooves.

FIG. 7 is a view illustrating still another arrangement of the first grooves.

FIG. 8 is a view illustrating a second housing.

FIG. 9 is a side cross-sectional view illustrating the second housing along line B-B of FIG. 8.

FIG. 10 is a view illustrating an outer surface of the second housing.

FIG. 11 is a cross-sectional view illustrating a coupling state of the first housing and the second housing.

FIG. 12 is a view illustrating another coupling state of a first housing and a second housing.

FIG. 13 is a cross-sectional view illustrating a comparison of a dimension of the first housing and a dimension of the second housing.

FIG. 14 is a view illustrating another first housing.

FIG. 15 is a cross-sectional view illustrating the first housing along line C-C of FIG. 14.

FIG. 16 is a view illustrating another second housing.

FIG. 17 is a view illustrating another first housing.

FIG. 18 is a view illustrating another second housing.

FIG. 19 is a side view illustrating the first housing illustrated in FIG. 17 and the second housing illustrated in FIG. 18.

FIG. 20 is a side cross-sectional view illustrating a motor according to an embodiment.

FIG. 21 is an exploded view illustrating the motor illustrated in FIG. 20.

FIG. 22 is a perspective view illustrating a first housing.

FIG. 23 is a side cross-sectional view illustrating the first housing along line A1-A1 of FIG. 22.

FIG. 24 is a view illustrating a second housing.

FIG. 25 is a side cross-sectional view illustrating the second housing along line B1-B1 of FIG. 24.

FIG. 26 is a view illustrating an outer surface of the second housing.

FIG. 27 is a plan view illustrating the second housing from above.

FIG. 28 is a cross-sectional view illustrating a coupling state of the first housing and the second housing.

FIG. 29 is a view illustrating a first curved surface of the first housing and a second curved surface of the second housing.

FIG. 30 is a side cross-sectional view illustrating a motor according to an embodiment.

FIG. 31 is an exploded view illustrating the motor illustrated in FIG. 30.

FIG. 32 is a perspective view illustrating a first housing.

FIG. 33 is a side cross-sectional view illustrating the first housing along line A2-A2 of FIG. 32 illustrated in FIG. 32.

FIG. 34 is a view illustrating a second housing.

FIG. 35 is a side cross-sectional view illustrating the second housing along line B2-B2 of FIG. 35.

FIG. 36 is a view illustrating an outer surface of the second housing illustrated in FIG. 34.

FIG. 37 is a view illustrating a third housing and the second housing.

FIG. 38 is a cross-sectional view illustrating a coupling state of the first housing and the second housing.

FIG. 39 is a perspective view illustrating a first bead, a second bead, and a third bead of a housing.

FIG. 40 is a side cross-sectional view illustrating a motor according to an embodiment.

FIG. 41 is an exploded view illustrating the motor illustrated in FIG. 40.

FIG. 42 is a perspective view illustrating a first housing.

FIG. 43 is a plan view illustrating the first housing illustrated in FIG. 42.

FIG. 44 is a side cross-sectional view illustrating the first housing along line A3-A3 of FIG. 42 illustrated in FIG. 42.

FIG. 45 is a view illustrating a second housing.

FIG. 46 is a side cross-sectional view illustrating the second housing along line B3-B3 of FIG. 45.

FIG. 47 is a view illustrating a sealing member and a groove of the second housing in which the sealing member is disposed.

FIG. 48 is a view illustrating an outer surface of the second housing.

FIG. 49 is a cross-sectional view illustrating a coupling state of the first housing and the second housing.

FIG. 50 is a view illustrating a caulking process of a protrusion.

FIG. 51 is a view illustrating a third sealing member, a fourth sealing member, and the second housing.

FIG. 52 is a side cross-sectional view illustrating a position of a first groove and a position of a first sealing member corresponding to the first groove according to a modified embodiment.

MODES OF THE INVENTION

A direction parallel to a longitudinal direction (vertical direction) of a shaft will be referred to as an axial direction, a direction perpendicular to the axial direction will be referred to as a radial direction with respect to the shaft, and a direction along a circumference of a circle having a radius in the radial direction will be referred to as a circumferential direction with respect to the shaft.

FIG. 1 is a side cross-sectional view illustrating a motor according to an embodiment.

Referring to FIG. 1, the motor according to the embodiment may include a shaft 100, a rotor 200, a stator 300, a busbar 400, a housing 500, and a bearing plate 600. Hereinafter, the term "inward" is referred to as a direction from the housing 500 toward the shaft 100 which is located at a center of the motor, and the term "outward" is referred to as a direction from the shaft 100 toward the housing 500 which is opposite to "inward." In addition, hereinafter, a circumferential direction or a radial direction is defined based on an axial center. In addition, a height direction of the housing 500 may be a direction parallel to an axial direction.

The shaft 100 may be coupled to the rotor 200. When an electromagnetic interaction occurs between the rotor 200 and the stator 300 when a current is supplied, the rotor 200 rotates, and the shaft 100 rotates in conjunction with the rotor 200. The shaft 100 may be connected to a vehicle's steering system, and power may be transmitted to the vehicle's steering system through the shaft 100.

The rotor 200 rotates through an electrical interaction with the stator 300. The rotor 200 may be disposed to correspond to the stator 300 and disposed inside the stator 300. The rotor 200 may include a rotor core 210 and magnets 220.

The stator 300 is disposed outside the rotor 200. The stator 300 may include a stator core 310, an insulator 320, and a coil 330. The insulator 320 is seated on the stator core 310. The coil 330 is mounted on the insulator 320. The coil 330 and the magnets of the rotor 200 induces an electrical interaction.

The busbar 400 may be disposed at one side of the stator 300 and connected to the coil 330.

The housing 500 may be disposed outside the stator 300. The housing 500 may be a cylindrical member.

The bearing plate 600 covers one open side of the housing 500. The bearing plate 600 accommodates a second bearing 800.

A first bearing 700 rotatably supports one side end of the shaft 100.

The second bearing 800 rotatably supports the other side end of the shaft.

FIG. 2 is an exploded view illustrating the motor illustrated in FIG. 1.

Referring to FIGS. 1 and 2, the housing 500 may be divided into a first housing 510 and a second housing 520. The first housing 510 accommodates the rotor 200 and the stator 300. The first housing 510 may be a cylindrical member of which one side and the other side are open. In addition, the first bearing 700 may be accommodated in the first housing 510.

The second housing 520 is a housing to be mounted on an external device. The second housing 520 may be coupled to an end portion of the other side of the first housing 510.

In this case, a forming method of the first housing 510 and a forming method of the second housing 520 are different. The first housing 510 may be formed through a press process. The second housing 520 may be formed through a die casting process.

The bearing plate 600 may be disposed on an end portion of one side of the first housing 510. The bearing plate 600 may be formed through a die casting process so that the second bearing 800 is included.

The first housing 510 which is the cylindrical member and has a simple structure may be formed through the press process to fundamentally prevent a crack which may occur in a die casting process, and the second housing 520 and the bearing plate 600, which have relatively complex structures, may be formed through a die casting process to secure manufacturing convenience.

Meanwhile, the first housing 510 and the bearing plate 600 may be fastened by a fastening member, and a sealing member 900 may be disposed between the first housing 510 and the bearing plate 600. The sealing member 900 may be an annular member.

FIG. 3 is a perspective view illustrating the first housing 510, and FIG. 4 is a side cross-sectional view illustrating the first housing 510 along line A-A of FIG. 3 illustrated in FIG. 3.

Referring to FIGS. 3 and 4, the first housing 510 may include a plurality of first grooves 511. The first grooves 511 are disposed in an outer circumferential surface of the first housing 510. The plurality of first grooves 511 may be disposed at predetermined intervals in the circumferential direction of the first housing 510. The first grooves 511 may be formed by performing a punching process on the outer circumferential surface of the first housing 510. The first grooves 511 are for coupling with the second housing 520. Particularly, the first grooves 511 are engaged with first protrusions 521 (see FIG. 8) to fix the second housing 520 such that the second housing 520 is not separated from the first housing 510 in the height direction of the housing 500.

Although each of the first grooves 511 is illustrated as a quadrangular shape, the present invention is not limited thereto, and the first groove 511 may be formed in one of various shapes such as a circular shape, an angular shape, an elliptical shape.

The first housing 510 may include a first base 513, a first sidewall 514, a second sidewall 515, and a fifth sidewall 516. The first sidewall 514 is disposed to protrude from the first base 513 toward one side, and the second sidewall 515 is disposed to protrude from the first base 513 toward the other side. An inner surface of the first sidewall 514 may be in contact with the stator 300.

The first sidewall 514 may have a first radius R1 about an axial center C of the first housing 510, and the second sidewall 515 may have a second radius R2. The second radius R2 is smaller than the first radius R1.

The first sidewall 514 may include first coupling units in an outer surface. The first coupling units may be the first grooves 511 disposed in the outer surface of the first sidewall 514. The first grooves 511 may be disposed in an edge of the first sidewall 514 adjacent to the first base 513.

An inner surface of the second sidewall 515 may be in contact with an outer wheel of the first bearing 700. The second sidewall 515 serves to accommodate the first bearing 700.

The fifth sidewall 516 is disposed to be bent inward from the second sidewall 515.

The shape of the first housing 510 may be implemented through the press process.

Meanwhile, the first housing 510 may include a flange 517. The flange 517 is for coupling with the bearing plate 600. The flange 517 may be disposed to be bent outward from one side end of the first sidewall 514. The sealing member 900 (see FIG. 1) is disposed to be in contact with the flange 517.

In a region in which the first housing 510 and the second housing 520 are in contact with each other, the first housing 510 may include a first region S2 and a second region S2. The first region S2 has the first radius R1 about the axial center C. The second region S2 has the second radius R2 which is different from the first radius R1 about the axial center C. The second radius R2 may be smaller than the first radius R1.

FIG. 5 is a view illustrating another arrangement of first grooves 511.

As illustrated in FIG. 3, although the plurality of first grooves 511 may be disposed on the same circumference of the first housing 510, as illustrated in FIG. 5, the plurality of first grooves 511 may also be disposed on different circumferences. For example, the plurality of first grooves 511 may be divided and disposed on a first circumference O1 and a second circumference O2. In addition, the first grooves 511 disposed on the first circumference O1 and the first grooves 511 disposed on the second circumference O2 may be disposed not to overlap in a direction parallel to an axial direction to be misaligned with each other.

FIG. 6 is a view illustrating another arrangement of first grooves 511.

Referring to FIG. 6, the plurality of first grooves 511 may be divided and disposed on a first circumference O1 and a second circumference O2 to be misaligned with each other in a circumferential direction, and parts of the first grooves 511 disposed on the first circumference O1 and parts of the first grooves 511 disposed on the second circumference O2 may be disposed to form an overlap region P1 in the circumferential direction.

FIG. 7 is a view illustrating still another arrangement of first grooves 511.

Referring to FIG. 7, the plurality of first grooves 511 may be divided and disposed on a first circumference O1 and a second circumference O2 to be misaligned with each other in a circumferential direction, and parts of the first grooves 511 disposed on the first circumference O1 and parts of the first grooves 511 disposed on the second circumference O2 may be disposed to form overlap regions O2 in a direction parallel to an axial direction.

FIG. 8 is a view illustrating the second housing 520, and FIG. 9 is a side cross-sectional view illustrating the second housing 520 along line B-B of FIG. 8.

Referring to FIGS. 8 and 9, the second housing 520 may include a plurality of first protrusions 521. The first protrusions 521 are disposed on an inner circumferential surface of the second housing 520. The plurality of first protrusions 521 may be disposed at predetermined intervals in the circumferential direction of the second housing 520. The first protrusion 521 may be formed in a process of die casting the second housing 520. Accordingly, the number, positions, and a shape of the first protrusions 521 may correspond to the first grooves 511 disposed in the first housing 510.

The second housing 520 may include a second base 523, a third sidewall 524, a fourth sidewall 525, and a sixth sidewall 526. The third sidewall 524 is disposed to protrude from the second base 523 toward one side. The fourth sidewall 525 is disposed to protrude from the second base 523 toward the other side. Coupling parts 527 may be disposed to protruded from an outer circumferential surface of the third sidewall 524. The coupling parts 527 are fastened to an external device.

The second housing 520 may include a third region S3 and a fourth region S4. The third region S3 is in contact with the first region S1. The fourth region S4 is in contact with the second region S2.

FIG. 10 is a view illustrating an outer surface of the second housing 520.

Referring to FIGS. 9 and 10, the outer surface of the second housing 520 may include third grooves 528, a fourth groove 529, and a fifth groove 501.

The third grooves 528 may be annular grooves disposed along a circumference of the fourth sidewall 525. The third grooves 528 may be concavely formed in the outer surface of the second housing 520 and may accommodate sealing oil or O-rings. The outer surface of the second housing 520 is a region to which an external mounting part is coupled. Foreign materials or water introduced through a gap between the external mounting part and the outer surface of the housing 520 may be blocked by the sealing oil or the O-rings accommodated in the third grooves 528.

The fourth groove 529 may be a ring type groove disposed along the circumference of the fourth sidewall 525. A protruding portion of the external mounting part may be seated in the fourth groove 529.

A membrane for ventilation may be disposed in the fifth groove 501.

FIG. 11 is a cross-sectional view illustrating a coupling state of the first housing 510 and the second housing 520.

Referring to FIG. 11, the second housing 520 is formed through a die casting process to cover the end portion of one side of the first housing 510. An inner surface of the second housing 520 is in contact with a part of an outer surface of the first housing 510.

A fifth region S5 is a region in which the first housing 510 and the second housing 520 overlap in the axial direction. Both of a sixth region S6 and a seventh region S7 are regions in which the first housing 510 and the second housing 520 overlap in the direction perpendicular to the axial direction.

In the fifth region S5, a part of the first housing 510 and a part of the second housing 520 may be disposed to overlap in the height direction of the housing 500 through a die casting process. For example. In a process of forming the second housing 520, the first housing 510 and the second housing 520 are coupled, the first protrusions 521 are disposed in the first grooves 511 at the same time, and thus a coupling force of the first housing 510 and the second housing 520 may be significantly increased in the axial direction.

The outer surface of the first sidewall 514 of the first housing 510 is in contact with an inner surface of the third sidewall 524 of the second housing 520. An outer surface of the first base 513 of the first housing 510 is in contact with an inner surface of the second base 523 of the second housing 520. In addition, an outer surface of the second sidewall 515 of the first housing 510 is in contact with an inner surface of the fourth sidewall 525 of the second housing 520. An outer surface of the fifth sidewall 516 is in contact with an inner surface of the sixth sidewall 526.

FIG. 12 is a view illustrating another coupling state of a first housing 510 and a second housing 520.

Referring to FIG. 12, in a process of forming a second housing 520, a second protrusion 522 and a second groove 512 may be disposed in addition to the first protrusions 521 and first grooves 511. The second protrusion 522 and the second groove 512 further increases a coupling force of the first housing 510 and the second housing 520 in a height direction of a housing 500.

The second protrusion 522 may be disposed on an inner surface of a fourth sidewall 525 of the second housing 520. The second groove 512 may be disposed in an outer surface of a second sidewall 515 of the first housing 510. The second protrusion 522 and the second groove 512 may be disposed as a plurality of second protrusions 522 and a plurality of second grooves 512, respectively, or each disposed as one member having an annular shape.

FIG. 13 is a cross-sectional view illustrating a comparison of a dimension of the first housing 510 and a dimension of the second housing 520.

Referring to FIG. 13, an outer diameter D1 of the first sidewall 514 should at least be smaller than an outer diameter D3 of the third sidewall 524. In addition, the outer diameter D1 of the first sidewall 514 is greater than an outer diameter D4 of the fourth sidewall 525. The outer diameter D2 of the second sidewall 515 is smaller than the outer diameter D4 of the fourth sidewall 525.

FIG. 14 is a view illustrating another first housing 510, FIG. 15 is a cross-sectional view illustrating the first housing along line C-C of FIG. 14, and FIG. 16 is a view illustrating another second housing.

Referring to FIGS. 14 to 16, the first housing 510 may include third protrusions 518. The third protrusions 518 may be disposed to protrude from an inner surface of the first housing 510. Positions of the third protrusions 518 corresponds to positions of first grooves 511. The third protrusions 518 may be formed through a punching process for forming the first grooves 511. Each of the first grooves 511 and the third protrusions 518 may have a circular shape. Referring to FIG. 12, the second housing 520 may include circular first protrusions 521. The first protrusions 521 are disposed in the first grooves 511 illustrated in FIG. 10.

FIG. 17 is a view illustrating another first housing 510, FIG. 18 is a view illustrating another second housing 520, and FIG. 19 is a side view illustrating the first housing 510 illustrated in FIG. 17 and the second housing 520 illustrated in FIG. 18.

Referring to FIGS. 17 to 19, in the first housing 510, an inner surface of a second sidewall 515 may be formed to cover a part of an outer circumferential surface of a first bearing 700. In addition, in the second housing 520, an inner surface of a fourth sidewall 525 may be disposed to be stepped. That is, the fourth sidewall 525 may include an eighth region S8 in contact with an outer surface of the second sidewall 515 and a ninth region S9 in contact with an outer surface of the first bearing 700, and the eighth region S8 and the ninth region S9 may be disposed to be stepped.

An inner surface of a third sidewall 524 is in contact with an outer surface of a first sidewall 514. The inner surface of the fourth sidewall 525 is also in contact with a part of an outer wheel of the first bearing 700, and the inner surface of the second sidewall 515 is in contact with the remaining part of the outer wheel of the first bearing 700. Accordingly, the first bearing 700 is fixed together with the first housing 510 and the second housing 520.

FIG. 20 is a side cross-sectional view illustrating a motor according to an embodiment.

Referring to FIG. 20, the motor according to the embodiment may include a shaft 1100, a rotor 1200, a stator 1300, a busbar 1400, a housing 1500, and a bearing plate 1600. Hereinafter, the term "inward" is referred to as a direction from the housing 1500 toward the shaft 1100 which is located at a center of the motor, and the term "outward" is referred to as a direction from the shaft 1100 toward the housing 1500 which is opposite to "inward." In addition, a circumferential direction or a radial direction is defined based on an axial center. In addition, a height direction of the housing 1500 may be a direction parallel to an axial direction.

The shaft 1100 may be coupled to the rotor 1200. When an electromagnetic interaction occurs between the rotor 1200 and the stator 1300 when a current is supplied, the rotor 1200 rotates, and the shaft 1100 rotates in conjunction with the rotor 1200. The shaft 1100 may be connected to a vehicle's steering system, and power may be transmitted to the vehicle's steering system through the shaft 1100.

The rotor 1200 rotates through an electrical interaction with the stator 1300. The rotor 1200 may be disposed to correspond to the stator 1300 and disposed inside the stator 300. The rotor 1200 may include a rotor core 1210 and magnets 1220.

The stator 1300 is disposed outside the rotor 1200. The stator 1300 may include a stator core 1310, an insulator 1320, and a coil 1330. The insulator 1320 is seated on the stator core 1310. The coil 1330 is mounted on the insulator 1320. The coil 1330 and the magnets of the rotor 1200 induces an electrical interaction.

The busbar 1400 may be disposed at one side of the stator 1300 and connected to the coil 1330.

The housing 1500 may be disposed outside the stator 1300. The housing 1500 may be a cylindrical member.

The bearing plate 1600 covers one open side of the housing 1500. The bearing plate 1600 accommodates a second bearing 1800.

A first bearing 1700 rotatably supports one side end of the shaft 1100.

The second bearing 1800 rotatably supports the other side end of the shaft.

FIG. 21 is an exploded view illustrating the motor illustrated in FIG. 20.

Referring to FIGS. 20 and 21, the housing 1500 may be divided into a first housing 510 and a second housing 1520. The first housing 1510 accommodates the rotor 1200 and the stator 1300. The first housing 1510 may be a cylindrical member of which one side and the other side are open. In addition, the first bearing 1700 may be accommodated in the first housing 1510.

The second housing 1520 is a housing to be mounted on an external device. The second housing 1520 may be coupled to an end portion of the other side of the first housing 1510.

In this case, a forming method of the first housing 1510 and a forming method of the second housing 1520 are different. The first housing 1510 may be formed through a press process. The second housing 1520 may be formed through a die casting process.

The bearing plate 1600 may be disposed on an end portion of one side of the first housing 1510. The bearing plate 1600 may be formed through a die casting process so that the second bearing 1800 is included.

The first housing 1510 which is the cylindrical member and has a simple structure may be formed through the press process to fundamentally prevent a crack which may occur in a die casting process, and the second housing 520 and the bearing plate 600, which have relatively complex structures, may be respectively formed through a forging process and a die casting process to secure manufacturing convenience.

Meanwhile, the first housing 1510 and the bearing plate 1600 may be fastened by a fastening member, and a sealing member 1900 may be disposed between the first housing 1510 and the bearing plate 1600. The sealing member 1900 may be an annular member.

FIG. 22 is a perspective view illustrating the first housing 1510, and FIG. 23 is a side cross-sectional view illustrating the first housing 1510 along line A1-A1 of FIG. 22.

Referring to FIGS. 22 and FIG. 23, the first housing 1510 may include a first wall 1511, a second wall 1512, a fifth wall 1513, a seventh wall 1514, and a flange 1515. The first wall 1511, the second wall 1512, the fifth wall 1513, the seventh wall 1514, and the flange 1515 may be merely divided and described according to shapes and functional characteristics and are formed as one connected member through a press process.

The first wall 1511 may be a cylindrical member having a first radius R11 about a center C of the housing 1500. The first bearing 1700 is accommodated inside the first wall 1511.

The second wall 1512 may be an annular member bent from one end of the first wall 1511 in the radial direction. The second wall 1512 may be disposed to be bent outward from one end of the first wall 1511 in a direction perpendicular to the axial direction. The second wall 1512 forms a bottom surface of the first housing 1510.

The fifth wall 1513 may be an annular member bent from the other end of the first wall 1511 in the radial direction. The fifth wall 1513 may be disposed to be vertically bent inward from the other end of the first wall 1511. An inner surface of the fifth wall 1513 forms a first hole H11 through which the shaft passes.

The seventh wall 1514 is a cylindrical member bent from one end of the second wall 1512 in the axial direction. The stator 1300 is accommodated inside the fifth wall 1513. The inner surface of the fifth wall 1513 may be in contact with the stator core 1310.

The flange 1515 is for coupling with the bearing plate 1600. The flange 1515 may be disposed to be bent outward from one side end of the seventh wall 1514. The sealing member 1900 (see FIG. 21) is disposed to be in contact with the flange 1515.

FIG. 24 is a view illustrating the second housing 1520, and FIG. 25 is a side cross-sectional view illustrating the second housing 1520 along line B1-B1 of FIG. 24.

Referring to FIGS. 24 and 25, the second housing 1520 may include a third wall 1521, a fourth wall 1522, a sixth wall 1523, a first extension part 1524, and a second extension part 1525. The third wall 1521, the fourth wall 1522, the sixth wall 1523, the first extension part 1524, and the second extension part 1525 may be merely divided and described according to shapes and functional characteristics and are formed as one connected member through a press process.

The third wall 1521 may be a cylindrical member having a second radius R21 about the center C of the housing 1500. The first wall 1511 of the first housing 1510 is positioned inside the third wall 1521. The third wall 1521 and the first wall 1511 may be disposed to overlap in the radial direction.

The fourth wall 1522 may be an annular member bent from one end of the third wall 1521 in the radial direction. The fourth wall 1522 may be disposed to be bent outward from one end of the third wall 1521 in the direction perpendicular to the axial direction.

The sixth wall 1523 may be an annular member bent from the other end of the third wall 1521 in the radial direction. The sixth wall 1523 may be disposed to be vertically bent inward from the other end of the third wall 1521. An inner surface of the sixth wall 1523 forms a second hole H21 through which the shaft 1100 passes.

The first extension part 1524 extends from an edge of the fourth wall 1522 in the radial direction.

The second extension part 1525 extends from the first extension part 1524 in the axial direction.

The first extension part 1524 and the second extension part 1525 are for coupling with an external device. The first extension part 1524 and the second extension part 1525 may be disposed as a plurality of first extension parts 1524 and a plurality second extension parts 1525. The plurality of first extension parts 1524 and the plurality of second extension parts 1525 may be disposed at intervals in the circumferential direction of the second housing 1520.

FIG. 26 is a view illustrating an outer surface of the second housing 1520.

Referring to FIGS. 6 and 7, the outer surface of the second housing 1520 may include first grooves 1526, a second groove 1527, and a third groove 1501.

The first grooves 1526 may be annular grooves disposed along a circumference of the fourth wall 1522. The first grooves 1526 may be concavely formed in the outer surface of the second housing 1520 and may accommodate oil or O-rings. The outer surface of the second housing 1520 is a region to which the external device is coupled. Foreign materials or water introduced through a gap between the external device and the outer surface of the housing 1520 may be blocked by the sealing oil or the O-rings accommodated in the first grooves 1526.

The second groove 1527 may be a ring type groove disposed along the circumference of the fourth wall 1522. A protruding portion of an external mounting part may be seated in the second groove 1527.

A membrane for ventilation may be disposed in the third groove 1501.

FIG. 27 is a plan view illustrating the second housing 1520 from above.

Referring to FIG. 17, a plurality of welding parts SP may be disposed on the second housing 1520. The welding parts SP may be indented or discolored regions formed by spot welding. The plurality of welding parts SP may be positioned on the fourth wall 1522. The plurality of welding parts SP may be disposed at intervals in the circumferential direction of the second housing 1520. The welding parts SP may be positioned inside the first grooves 1526. Indented or discolored regions corresponding to the welding parts SP of the second housing 1520 may also be disposed on the first housing 1510.

FIG. 28 is a cross-sectional view illustrating a coupling state of the first housing 1510 and the second housing 1520.

Referring to FIG. 28 the first housing 1510 and the second housing 1520 may be coupled through a welding process. The second wall 1512 of the first housing 1510 is in contact with the fourth wall 1522 of the second housing 1520. The second wall 1512 may include a first contact surface CS1. The fourth wall 1522 may include a second contact surface CS2. In a state in which the first contact surface CS1 and the second contact surface CS2 are in contact with each other, a spot welding process is performed. Accordingly, a plurality of first regions S11 in which melted and solidified nuggets are formed may be disposed between the first contact surface CS1 and the second contact surface CS2.

The first regions S11 correspond to positions of the welding parts SP. The first regions S11 may be disposed in the circumferential direction of the housing 1500.

The housing 1500 may include a second region S2 in which the first contact surface CS1 and the second contact surface CS2 disposed to overlap in the axial direction. The plurality of first regions S11 may be disposed in the second region S2.

Meanwhile, the first extension part 1524 may be disposed to overlap the first wall 1511 of the first housing 1510 in the direction perpendicular to the axial direction. The second extension part 1525 may be disposed to overlap the seventh wall 1514 of the first housing 1510 in the direction perpendicular to the axial direction. An inner surface of the first wall 1511 may be in contact with an outer wheel of the first bearing 1700.

FIG. 29 is a view illustrating a first curved surface SC1 of the first housing 1510 and a second curved surface SC2 of the second housing 1520.

Referring to FIG. 29, the first curved surface SC1 may be disposed between the first wall 1511 and the second wall 1512. The second curved surface SC2 may be disposed between the second wall 1512 and the second wall 1512. A radius R23 of curvature of the first curved surface SC1 may be smaller than a radius R24 of curvature of the second curved surface SC2. A space G1 may be formed between the first curved surface SC1 and the second curved surface SC2.

The first wall 1511 of the first housing 1510 and the third wall 1521 of the second housing 1520 may be in contact with each other. However, the present invention is not limited thereto, and there may be a gap between the first wall 1511 and the third wall 1521.

FIG. 30 is a side cross-sectional view illustrating a motor according to an embodiment.

Referring to FIG. 30, the motor according to the embodiment may include a shaft 2100, a rotor 2200, a stator 2300, a busbar 2400, a housing 2500, and a bearing plate 2600.

Hereinafter, the term "inward" is referred to as a direction from the housing 2500 toward the shaft 2100 which is located at a center of the motor, and the term "outward" is referred to as a direction from the shaft 2100 toward the housing 2500 which is opposite to "inward." In addition, hereinafter, a circumferential direction or a radial direction is defined based on an axial center.

The shaft 2100 may be coupled to the rotor 2200. When an electromagnetic interaction occurs between the rotor 2200 and the stator 2300 when a current is supplied, the rotor 2200 rotates, and the shaft 2100 rotates in conjunction with the rotor 2200. The shaft 2100 may be connected to a vehicle's steering system, and power may be transmitted to the vehicle's steering system through the shaft 2100.

The rotor 2200 rotates through an electrical interaction with the stator 2300. The rotor 2200 may be disposed to correspond to the stator 2300 and disposed inside the stator 300. The rotor 2200 may include a rotor core 2210 and magnets 2220.

The stator 2300 is disposed outside the rotor 2200. The stator 2300 may include a stator core 2310, an insulator 2320, and a coil 2330. The insulator 2320 is seated on the stator core 2310. The coil 330 is mounted on the insulator 2320. The coil 2330 and the magnets of the rotor 2200 induces an electrical interaction.

The busbar 2400 may be disposed at one side of the stator 2300 and connected to the coil 2330.

The housing 2500 may be disposed outside the stator 2300. The housing 2500 may be a cylindrical member.

The bearing plate 2600 covers one open side of the housing 2500. The bearing plate 2600 accommodates a second bearing 2800.

A first bearing 2700 rotatably supports one side end of the shaft 2100.

The second bearing 2800 rotatably supports the other side end of the shaft 2100.

FIG. 31 is an exploded view illustrating the motor illustrated in FIG. 30.

Referring to FIGS. 30 and 31, the housing 2500 may be divided into a first housing 2510, a second housing 2520, and a third housing 2530. The first housing 2510 accommodates the rotor 2200 and the stator 2300. The first housing 2510 may be a cylindrical member of which one side and the other side are open. In addition, the first bearing 2700 may be accommodated in the first housing 2510.

The second housing 2520 is a housing to be mounted on an external device. The second housing 2520 may be coupled to an end portion of the other side of the first housing 2510.

The third housing 2530 is a housing to be mounted to the external device along with the second housing 2520. The third housing 2530 may be coupled to the second housing 2520. The third housing 2530 may be provided as a plurality of third housings 2530.

In this case, a method of forming the first housing 2510, a method of forming the second housing 2520, and a method of forming the third housing 2530 are different. The first housing 2510 may be formed through a press process. The second housing 2520 may be formed through a die casting process. In addition, the third housing 2530 may be formed through a forging process.

The bearing plate 2600 may be disposed on an end portion of one side of the first housing 2510. The bearing plate 2600 may be formed through a die casting process so that the second bearing 2800 is included.

The first housing 2510 which is the cylindrical member and has a simple structure may be formed through the press process to fundamentally prevent a crack which may occur in a die casting process, and the second housing 2520 and the bearing plate 2600, which have relatively complex structures, may be formed through a die casting process to secure manufacturing convenience.

Meanwhile, the first housing 2510 and the bearing plate 2600 may be fastened by a fastening member, and a sealing member 2900 may be disposed between the first housing 2510 and the bearing plate 2600. The sealing member 2900 may be an annular member.

Meanwhile, another sealing member 2100a may be disposed between the first housing 2510 and the second housing 2520. The corresponding sealing member 2100a prevents foreign materials or water from being introduced through a gap between the first housing 2510 and the second housing 2520.

FIG. 32 is a perspective view illustrating the first housing 2510, and FIG. 33 is a side cross-sectional view illustrating the first housing 2510 along line A2-A2 of FIG. 32 illustrated in FIG. 32.

Referring to FIGS. 32 and 33, the first housing 2510 may include a first base 2513, a first sidewall 2514, a second sidewall 2515, and a fifth sidewall 2516. The first sidewall 2514 is disposed to protrude from the base 2513 toward one side, and the second sidewall 2515 is disposed to protrude from the first base 2513 toward the other side. An inner surface of the first sidewall 2514 may be in contact with the stator 2300.

The first sidewall 2514 may have a first radius R12 about a center C of the first housing 2510, and the second sidewall 2515 may have a second radius R22. The second radius R22 may be smaller than the first radius R12.

An inner surface of the second sidewall 2515 may be in contact with an outer wheel of the first bearing 2700. The second sidewall 2515 serves to accommodate the first bearing 2700.

The fifth sidewall 2516 is disposed to be bent inward from the second sidewall 2515.

A shape of the first housing 2510 may be implemented through the press process.

Meanwhile, the first housing 2510 may include a flange 2517. The flange 2517 is for coupling with the bearing plate 2600. The flange 2517 may be disposed to be bent outward from one side end of the first sidewall 2514. The sealing member 2900 (see FIG. 31) is disposed to be in contact with the flange 2517.

FIG. 34 is a view illustrating the second housing 2520, and FIG. 35 is a side cross-sectional view illustrating the second housing 2520 along line B2-B2 of FIG. 35.

Referring to FIGS. 34 and 35, the second housing 2520 may include a second base 2523, a third sidewall 2525, and a sixth sidewall 2526.

The third sidewall 2525 is disposed to protrude from the second base 2523 toward one side. The third sidewall 2525 is disposed to protrude from the second base 2523 toward the other side.

The second base 2523 may include a first groove 2527. The first groove 2527 is concavely disposed in an outer surface of the second base 2523. The first groove 2527 is disposed in an annular shape. The sealing member 2100 is disposed in the first groove 2527.

FIG. 36 is a view illustrating an outer surface of the second housing 2520 illustrated in FIG. 34.

Referring to FIG. 36, the outer surface of the second base 2523 may include second grooves 2528, a third groove 2529, and a fourth groove 2501.

The third grooves 2528 may be annular grooves disposed along a circumference of the fourth sidewall 2525. The third grooves 2528 may be concavely formed in the outer surface of the second housing 2520 and may accommodate sealing oil or O-rings. The outer surface of the second housing 2520 is a region to which an external mounting part is coupled. Foreign materials or water introduced through a gap between the external mounting part and the outer surface of the housing 2520 may be blocked by the sealing oil or the O-rings accommodated in the third grooves 2528.

The second base 2523 may include a first part 2523A and a second part 2523B.

The first part 2523A is a part overlapping the first housing 2510 in an axial direction and is in contact with the first base 2513. The second part 2523B is a part, which does not overlap the first housing 2510 in the axial direction, and extends from an edge of the first part 2523A.

The sixth sidewall 2526 is in contact with the fifth sidewall 2516.

FIG. 37 is a view illustrating the third housing 2530 and the second housing 2520.

Referring to FIG. 37, the plurality of third housings 2530 may be disposed. The plurality of third housings 2530 may be spaced apart from each other in the circumferential direction. The plurality of third housings 2530 are disposed to be aligned with the second part 2523B of the second housing 2520. Cross-sectional shapes of the third housings 2530 corresponds to a cross-sectional shape of the second part 2523B. The second part 2523B includes first holes H12. At least some of the third housings 2530 may include second holes H22 aligned with the first holes H12. Fastening members may pass through the second holes H22 and the first holes H12 to be coupled to the external mounting part.

The third housings 2530 may include fourth sidewalls 2531 and third bases 2532. The fourth sidewalls 2531 may be in contact with an outer surface of the first sidewall 2514 of the first housing 2510. The third bases 2532 may be in contact with the second part 2523B. The third housings 2530 are disposed to overlap the second housing 2520 in the axial direction.

The second housing 2520 may be manufactured through a die casting process, and the third housing 2530 may be manufactured through a forging process. The second housing 2520 and the third housings 2530 may be manufactured through different methods and coupled by welding.

Since the second housing 2520 has a flat plate shape, a postprocess is not performed to form a first groove 2523Aa in the outer surface of the second housing 2520, the first groove 2523Aa may be implemented at once in a die casting process for manufacturing the second housing 2520, and thus there is an advantage of reducing a manufacturing process.

FIG. 38 is a cross-sectional view illustrating a coupling state of the first housing 2510 and the second housing 2520.

Referring to FIG. 38, the second housing 2520 is disposed to cover the end portion of one side of the first housing 2510. An inner surface of the second housing 2520 is in contact with a part of an outer surface of the first housing 2510.

An outer surface of the first base 2513 of the first housing 2510 is in contact with an inner surface of the second base 2523 of the second housing 2520. In addition, an outer surface of the second sidewall 2515 of the first housing 2510 is in contact with an inner surface of the fourth sidewall 2525 of the second housing 2520. An outer surface of the fifth sidewall 2516 is in contact with an inner surface of the sixth sidewall 2526.

The fourth sidewall 2531 of the third housings 2530 are in contact with the first sidewall 2514 of the first housing 2510. The third bases 2532 of the third housings 2530 are in contact with the second base 2523 of the second housing 2520.

The third housings 2530 are disposed to overlap the first housing 2510 in the radial direction and to overlap the second housing 2520 in the axial direction. The first housing 2510 is also disposed to overlap the second housing 2520 in the axial direction.

Empty spaces G2 may be formed between an outer surface of a corner of the first housing 2510, the inner surface of the second housing 2520, and inner surfaces of the third housings 2530. This may be the spaces G2 which may be generated in a process of welding and coupling the first housing 2510, in which a curved surface is formed around a corner through the press process, and the second housing 2520, and the third housing 2530 which are formed through a die casting process and a forging process.

FIG. 39 is a perspective view illustrating a first bead B12, a second bead B22, and a third bead B32 of the housing.

Referring to FIG. 39, the first housing 2510, the second housing 2520, and the third housings 2530 may be coupled by welding.

The first housing 2510 and the second housing 2520 are coupled by welding a boundary between the first housing 2510 and the second housing 2520, that is, around an edge of the first base 2513 and an edge of the second base 2523 which are adjacent to each other. By the welding, the first bead B12 is formed along the boundary between the first housing 2510 and the second housing 2520 in the circumferential direction.

The second housing 2520 and the third housings 2530 are coupled by welding boundaries between the second housing 2520 and the third housings 2530, that is, around the edge of the second base 2523 and edges of the third bases 2532 which are adjacent to each other. By the welding, the second bead B22 is formed along a boundary between the second housing 2520 and the third housings 2530 in the circumferential direction.

The first bead B12 and the second bead B22 may be consecutively disposed in the circumferential direction.

The third housings 2530 and the first housing 2510 are coupled by welding boundaries between the third housings 2530 and the first housing 2510, that is, edges of the fourth sidewalls 2531 and the outer surface of the first sidewall 2514 which are adjacent to each other. By the welding, the third bead B32 is formed along the boundaries between the first housing 2510 and the third housings 2530 in the axial direction.

The third bead B32 may be coupled to the first bead B12 or the second bead B22.

FIG. 40 is a side cross-sectional view illustrating a motor according to an embodiment.

Referring to FIG. 40, the motor according to the embodiment may include a shaft 3100, a rotor 3200, a stator 3300, a busbar 3400, a housing 3500, and a bearing plate 3600.

Hereinafter, the term "inward" is referred to as a direction from the housing 3500 toward the shaft 3100 which is located at a center of the motor, and the term "outward" is referred to as a direction from the shaft 3100 toward the housing 3500 which is opposite to "inward." In addition, hereinafter, a circumferential direction or a radial direction is defined based on an axial center.

The shaft 3100 may be coupled to the rotor 3200. When an electromagnetic interaction occurs between the rotor 3200 and the stator 3300 due to a current being supplied, the rotor 3200 rotates, and the shaft 3100 rotates in conjunction with the rotor 3200. The shaft 3100 may be connected to a vehicle's steering system, and power may be transmitted to the vehicle's steering system through the shaft 3100.

The rotor 3200 rotates through an electrical interaction with the stator 3300. The rotor 3200 may be disposed to correspond to the stator 3300 and disposed inside the stator 300. The rotor 3200 may include a rotor core 3210 and magnets 3220.

The stator 3300 is disposed outside the rotor 3200. The stator 3300 may include a stator core 3310, an insulator 3320, and a coil 3330. The insulator 3320 is seated on the stator core 3310. The coil 3330 is mounted on the insulator 3320. The coil 3330 and the magnets of the rotor 3200 induces an electrical interaction.

The busbar 3400 may be disposed at one side of the stator 3300 and connected to the coil 3330.

The housing 3500 may be disposed outside the stator 3300. The housing 3500 may be a cylindrical member.

The bearing plate 3600 covers one open side of the housing 3500. The bearing plate 3600 accommodates a second bearing 3800.

A first bearing 3700 rotatably supports one side end of the shaft 3100.

The second bearing 3800 rotatably supports the other side end of the shaft 3100.

FIG. 41 is an exploded view illustrating the motor illustrated in FIG. 40.

Referring to FIGS. 40 and 41, the housing 3500 may be divided into a first housing 3510 and a second housing 3520. The first housing 3510 accommodates the rotor 3200 and the stator 3300. The first housing 3510 may be a cylindrical member of which one side and the other side are open. In addition, the first bearing 3700 may be accommodated in the first housing 3510.

The second housing 3520 is a housing to be mounted on an external device. The second housing 3520 may be coupled to an end portion of the other side of the first housing 3510.

In this case, a forming method of the first housing 3510 and a forming method of the second housing 3520 are different. The first housing 3510 may be formed through a press process. The second housing 3520 may be formed through a die casting process.

The bearing plate 3600 may be disposed on an end portion of one side of the first housing 3510. The bearing plate 3600 may be formed through a die casting process so that the second bearing 3800 is included.

The first housing 3510 which is the cylindrical member and has a simple structure may be formed through the press process to fundamentally prevent a crack which may occur in a die casting process, and the second housing 3520 and the bearing plate 3600, which have relatively complex structures, may be formed through a die casting process to secure manufacturing convenience.

Meanwhile, the first housing 3510 and the bearing plate 3600 may be fastened by a fastening member, and a sealing member 3900 may be disposed between the first housing 3510 and the bearing plate 3600. The sealing member 3900 may be an annular member.

Meanwhile, another sealing member 3100a may be disposed between the first housing 3510 and the second housing 3520. The corresponding sealing member 3100a prevents foreign materials or water from being introduced through a gap between the first housing 3510 and the second housing 3520.

FIG. 42 is a perspective view illustrating first housing 3510, FIG. 43 is a plan view illustrating the first housing 3510 illustrated in FIG. 42, and FIG. 44 is a side cross-sectional view illustrating the first housing 3510 along line A3-A3 of FIG. 42 illustrated in FIG.42.

Referring to FIGS. 42 to 44, the first housing 3510 may include a plurality of holes 3511. The holes 3511 are disposed in a first base 3513. The plurality of holes 3511 may be disposed at predetermined intervals in the circumferential direction of the first housing 3510. The holes 3511 are for coupling with the second housing 3520. Although each of the holes 3511 is illustrated as a hole, the present invention is not limited thereto, and the hole 3511 may be formed in one of various shapes such as a circular shape, an angular shape, an elliptical shape.

The first housing 3510 may include the first base 3513, a first sidewall 3514, a second sidewall 3515, and a fifth sidewall 3516. The first sidewall 3514 is disposed to protrude from the first base 3513 toward one side, and the second sidewall 3515 is disposed to protrude from the first base 3513 toward the other side. An inner surface of the first sidewall 3514 may be in contact with the stator 3300.

The first sidewall 3514 may have a first radius R31 about a center C of the first housing 3510, and the second sidewall 3515 may have a second radius R32. The second radius R32 is smaller than the first radius R31.

An inner surface of the second sidewall 3515 may be in contact with an outer wheel of the first bearing 3700. The second sidewall 3515 serves to accommodate the first bearing 3700.

The fifth sidewall 3516 is disposed to be bent inward from the second sidewall 3515.

A shape of the first housing 3510 may be implemented through the press process.

Meanwhile, the first housing 3510 may include a flange 3517. The flange 3517 is for coupling with the bearing plate 3600. The flange 3517 may be disposed to be bent outward from one side end of the first sidewall 3514. The sealing member 3900 (see FIG. 41) is disposed to be in contact with the flange 3517.

FIG. 45 is a view illustrating the second housing 3520, and FIG. 46 is a side cross-sectional view illustrating the second housing 3520 along line B3-B3 of FIG. 45.

Referring to FIGS. 45 and 46, the second housing 3520 may include a plurality of protrusions 3521. The protrusions 3521 are disposed on a second base 3523 of the second housing 3520. The plurality of protrusions 3521 may be disposed at predetermined intervals in the circumferential direction of the second housing 3520. The protrusions 3521 may be formed in the process of die casting the second housing 3520. Accordingly, the number, positions, shapes of the protrusions 3521 may correspond to the holes 3511 disposed in the first housing 3510. In a state in which the first housing 3510 and the second housing 3520 are coupled, each of the protrusions 3521 is disposed to pass through one of the holes 3511.

The second housing 3520 may include the second base 3523, a third sidewall 3524, a fourth sidewall 3525, and a sixth sidewall 3526. The third sidewall 3524 is disposed to protrude from the second base 3523 toward one side. The fourth sidewall 3525 is disposed to protrude from the second base 3523 toward the other side. Coupling parts 3527 may be disposed to protrude from an outer circumferential surface of the third sidewall 3524. The coupling parts 3527 are fastened to an external device. The sixth sidewall 3526 is in contact with the fifth sidewall 3516.

The second base 3523 may include grooves 3528. In the grooves 3528, first grooves 3528a and a second groove 3528b may be disposed. Sealing members 3100a are disposed in the first grooves 3528a and the second groove 3528b.

FIG. 47 is a view illustrating the sealing members 3100a and the grooves of the second housing 3520 in which the sealing member is disposed.

Referring to FIG. 47, each of the first grooves 3528a is disposed in an annular shape along a circumference of the protrusion 3521. The first groove 3528a may be concavely formed in the first base 3513. The protrusion 3521 is positioned inside the first groove 3528a.

The second groove 3528b is disposed in an annular shape. The second groove 3528b may be concavely formed in the first base 3513. The second groove 3528b may be disposed outside the first grooves 3528a in the radial direction. All of a plurality of first grooves 3528a may be disposed inside the second groove 3528b.

The sealing members 3100a may include a first sealing members 3110 and a second sealing member 3120. Each of the first sealing member 3110 and the second sealing member 3120 may be an annular member. The first sealing member 3110 is disposed in the first groove 3528a. The second sealing member 3120 is disposed in the second groove 3528b.

FIG. 48 is a view illustrating an outer surface of the second housing 3520.

Referring to FIGS. 47 and 48, the outer surface of the second housing 3520 may include fifth grooves 3528e, a sixth groove 3528f, and a seventh groove 3501.

The fifth grooves 3528e may be disposed along a circumference of the fourth sidewall 3525 and each may have an annular shape. The fifth grooves 3528e may be concavely formed in the outer surface of the second housing 3520 and may accommodate sealing oil or O-rings. The outer surface of the second housing 3520 is a region to which an external mounting part is coupled. Foreign materials or water introduced through a gap between the external mounting part and the outer surface of the housing 3520 may be blocked by the sealing oil or the O-rings accommodated in the fifth grooves 3528e.

The sixth groove 3528f may be a ring type groove disposed along the circumference of the fourth sidewall 3525. A protruding portion of the external mounting part may be seated in the sixth groove 3528f.

A membrane for ventilation may be disposed in the seventh groove 3501.

FIG. 49 is a cross-sectional view illustrating a coupling state of the first housing 3510 and the second housing 3520, and FIG. 50 is a view illustrating a caulking process of the protrusion.

Referring to FIG. 49, the second housing 3520 is formed to cover the end portion of one side of the first housing 3510. An inner surface of the second housing 3520 is in contact with a part of an outer surface of the first housing 3510.

An outer surface of the first sidewall 3514 of the first housing 3510 is in contact with an inner surface of the third wall 3524 of the second housing 3520. An outer surface of the first base 3513 of the first housing 3510 is in contact with an inner surface of the second base 3523 of the second housing 3520. In addition, an outer surface of the second sidewall 3515 of the first housing 3510 is in contact with an inner surface of the fourth sidewall 3525 of the second housing 3520. An outer surface of the fifth sidewall 3516 is in contact with an inner surface of the sixth sidewall 3526.

Referring to FIGS. 49 and 50, in a state in which the first housing 3510 and the second housing 3520 are coupled, the protrusion 3521 is disposed to pass through the goove 3528. When caulking is performed on the protrusion 3521 from above the protrusion 3521, an end portion of the protrusion 3521 is deformed and is in contact with an inner surface 3513b of the first base 3513.

In the state in which the protrusion 3521 is caulked, from a viewpoint of the second base 3523, the second base 3523 may include a first region S31, a second region S32, and a third region S33.

The first region S31 is a region in contact with the inner surface 3513b of the first base 3513. The first region S31 may be a part of the protrusion 3521. The second region S32 is a region in contact with an inner surface 3513a of the first base 3513. The third region S33 may be a region which passes through the hole 3511 to connect the first region S31 and the second region S32 and may be a part of the protrusion 3521.

The protrusion 3521 of the second base 3523 couples the first housing 3510 and the second housing 3520. Since the first base 3513 is restricted by the protrusion 3521 in ax axial direction, the first housing 3510 and the second housing 3520 are prevented from being separated from each other in the axial direction.

Water or foreign materials may be introduced through a gap between the first housing 3510 and the second housing 3520. The foreign materials or water introduced through the gap between the first housing 3510 and the second housing 3520 may flow to the outside of the second housing 3520. Since control elements of the external mounting part are positioned outside the second housing 3520, when the water or the foreign materials are introduced to the outside of the second housing 3520, a serious problem may occur.

The gap between the first housing 3510 and the second housing 3520 may correspond to two paths below.

First, water or foreign materials may be introduced through a first path P31 which is a gap between the first base 3513 and the protrusion 3521. This may be blocked by the first sealing member 3110.

Second, water or foreign materials may be introduced through a second path P31 which is a gap between the first sidewall 3514 and the third sidewall 3524. This may be blocked by the second sealing member 3120.

When the protrusion 3521 is caulked, the first sealing member 3110 and the second sealing member 3120, which are disposed between the first base 3513 and the second base 3523, are compressed so that the gap between the first housing 3510 and the second housing 3520 are closed to prevent water or foreign materials from being introduced.

FIG. 51 is a view illustrating a third sealing member 3130, a fourth sealing member 3140, and the second housing 3520.

Referring to FIG. 51, by replacing the first sealing member 3110, the third sealing member 3130 and the fourth sealing member 3140 may be disposed on the second housing 3520. A radius of the fourth sealing member 3140 may be smaller than a radius of the third sealing member 3130. The protrusion 3521 is disposed between the third sealing member 3130 and the fourth sealing member 3140 in the radial direction.

The second housing 3520 may include a third groove 3528c and a fourth groove 3528d. A radius of the fourth groove 3528d may be smaller than a radius of the third groove 3528c. The protrusion 3521 is disposed between the third groove 3528c and the fourth groove 3528d in the radial direction. The third sealing member 3130 is disposed in the third groove 3528c. The fourth sealing member 3140 is disposed in the fourth groove 3528d.

FIG. 52 is a side cross-sectional view illustrating a position of a first groove and a position of a first sealing member corresponding to the first groove according to a modified embodiment.

Referring to FIG. 52, a first groove 3528a may also be disposed in an inner surface 3513b of a first base 3513 in contact with a protrusion 3521.

The above-described embodiment can be used in various devices for vehicles, home appliances, and the like.

The invention claimed is:

1. A motor, comprising:
a housing; and
a stator disposed inside the housing, wherein the housing includes a first housing and a second housing, wherein the first housing includes a first region and a second region and the second housing includes a third region coupled to the first region and a fourth region coupled to the second region, wherein the first region includes a first groove and the second region includes a second groove, wherein the third region includes a first protrusion corresponding to the first groove and the fourth region includes a second protrusion corresponding to the second groove, wherein a radial position of a coupling area of the first groove and the first protrusion is different from a radial position of a coupling area of the second groove and the second protrusion, and wherein an axial position of the coupling area of the first groove and the first protrusion is different from an axial position of the coupling area of the second groove and the second protrusion.

2. The motor of claim 1, wherein the first housing includes a first sidewall having a first radius and a second sidewall having a second radius smaller than the first radius, wherein the second housing includes a third sidewall in contact with the first sidewall and a fourth sidewall in contact with the second sidewall, wherein an inner surface of the first sidewall is in contact with the stator, and wherein an inner surface of the second sidewall is in contact with an outer wheel of a first bearing supporting the shaft.

3. The motor of claim 1, wherein a plurality of the first groove is disposed at predetermined intervals in a circumferential direction of the first housing.

4. The motor of claim 3, wherein the plurality of the first groove is divided and disposed along a first circumference and a second circumference about an axial center.

5. The motor of claim 4, wherein the first grooves disposed on the first circumference and the second grooves disposed on the second circumference are disposed to be misaligned with each other in the circumferential direction, and parts of the first grooves disposed on the first circumference and parts of the second grooves disposed on the second circumference are disposed to overlap in the axial direction.

6. A motor, comprising:
a housing; and
a stator disposed inside the housing, wherein the housing includes a first housing and a second housing, wherein the housing includes a first coupling area and a second coupling area in which the first housing and the second housing are engaged with each other via a concavo-convex engagement, wherein a radial position of the first coupling area and a radial position of the second coupling area are different from each other, wherein an axial position of the first coupling area and an axial position of the second coupling area are different from each other, wherein the first housing includes a first wall having a first radius and a second wall disposed to be bent from the first wall in a radial direction, wherein the second housing includes a third wall having a second radius greater than the first radius and a fourth wall disposed to be bent from the third wall in the radial direction, wherein the first wall is in contact with the third wall, wherein the first wall and the second wall are connected by a first curved surface, wherein the third wall and the fourth wall are connected by a second curved surface, and wherein a radius of curvature of the first curved surface is smaller than a radius of curvature of the second curved surface.

7. The motor of claim 6, wherein the first housing includes a first contact surface, wherein the second housing includes a second contact surface in contact with the first contact surface, and wherein a plurality of first regions, in which melted and solidified nuggets are formed, are disposed between the first contact surface and the second contact surface.

8. A motor, comprising:
a housing; and
a stator disposed inside the housing, wherein the housing includes a first housing and a second housing, wherein the housing includes a first coupling area and a second coupling area in which the first housing and the second housing are engaged with each other via a concavo-convex engagement, wherein a radial position of the first coupling area and a radial position of the second coupling area are different from each other, wherein an axial position of the first coupling area and an axial position of the second coupling area are different from each other, wherein the housing includes a third housing coupled to the second housing, wherein the first housing and the third housing are disposed to overlap in a radial direction, wherein the second housing and the third housing are disposed to overlap in an axial direction, and wherein a first bead disposed on a boundary of the first housing and the second housing and a second bead disposed on a boundary of the second housing and the third housing are consecutively disposed.

9. The motor of claim 8, wherein the first housing includes a first sidewall having a first radius, a second sidewall having a second radius smaller than the first radius, and a first base disposed between the first sidewall and the second sidewall, wherein the second housing includes a third sidewall in contact with the first sidewall and a second base which is connected to the third sidewall and is in contact with the first base, and wherein the third housing includes a fourth sidewall in contact with an outer surface of the first sidewall and a third base in contact with a part of the second base.

10. A motor, comprising:
a housing; and
a stator disposed inside the housing, wherein the housing includes a first housing and a second housing, wherein the housing includes a first coupling area and a second coupling area in which the first housing and the second housing are engaged with each other via a concavo-convex engagement, wherein a radial position of the first coupling area and a radial position of the second coupling area are different from each other, wherein an axial position of the first coupling area and an axial position of the second coupling area are different from each other, wherein the first housing includes a first sidewall having a first radius, a second sidewall having a second radius smaller than the first radius, and a first base disposed between the first sidewall and the second sidewall, wherein the second housing includes a third sidewall in contact with the first sidewall, a fourth sidewall in contact with the second sidewall, and a second base disposed between the third sidewall and the fourth sidewall, wherein the first base includes a hole, wherein the second base includes a protrusion corresponding to the hole, wherein a part of the protrusion is in contact with an inner surface of the first base, wherein a sealing member is disposed between the first base and the second base, and wherein the sealing member include a first sealing member disposed along a circumference of the hole and a second sealing member disposed along a circumference of the second sidewall.

* * * * *